US011379920B2

(12) United States Patent
Steinmann et al.

(10) Patent No.: US 11,379,920 B2
(45) Date of Patent: Jul. 5, 2022

(54) FLIGHT TRAJECTORY PREDICTION SYSTEM AND FLIGHT TRAJECTORY-BORNE AUTOMATED DELAY RISK TRANSFER SYSTEM AND CORRESPONDING METHOD THEREOF

(71) Applicant: Swiss Reinsurance Company Ltd., Zurich (CH)

(72) Inventors: Lukas Adrian Steinmann, Hedingen (CH); Gianni Biason, Wallisellen (CH)

(73) Assignee: Swiss Reinsurance Company Ltd., Zurich (CH)

( * ) Notice: Subject to any disclaimer, the term of this patent is extended or adjusted under 35 U.S.C. 154(b) by 288 days.

(21) Appl. No.: 15/656,694

(22) Filed: Jul. 21, 2017

(65) Prior Publication Data

US 2018/0181144 A1    Jun. 28, 2018

Related U.S. Application Data

(63) Continuation of application No. PCT/EP2016/082671, filed on Dec. 23, 2016.

(51) Int. Cl.
*G06Q 40/08* (2012.01)
*G06Q 30/02* (2012.01)
(Continued)

(52) U.S. Cl.
CPC ............ *G06Q 40/08* (2013.01); *G05D 1/0022* (2013.01); *G05D 1/0088* (2013.01); *G05D 1/104* (2013.01);
(Continued)

(58) Field of Classification Search
CPC ....... G06Q 40/08; G08G 5/0043; G05D 1/104
See application file for complete search history.

(56) References Cited

U.S. PATENT DOCUMENTS

| | | | |
|---|---|---|---|
| 8,942,914 B2 * | 1/2015 | Subbu | G08G 5/0043 701/120 |
| 2003/0050746 A1 * | 3/2003 | Baiada | G08G 5/0043 701/3 |

(Continued)

FOREIGN PATENT DOCUMENTS

| | | | |
|---|---|---|---|
| WO | WO 2010/027633 A2 | 3/2010 | |
| WO | WO 2013/126866 A1 | 8/2013 | |
| WO | WO-2018009914 A2 * | 1/2018 | ......... G01C 21/3423 |

OTHER PUBLICATIONS

"Nasa & The Next Generation Air Transportation System (NEXTGEN)", Jun. 2007, Available at: https://www.nasa.gov/sites/default/files/atoms/files/nextgen_whitepaper_06_26_07.pdf. (Year: 2007).*

(Continued)

*Primary Examiner* — David P Sharvin
*Assistant Examiner* — Gregory Harper
(74) *Attorney, Agent, or Firm* — Oblon, McClelland, Maier & Neustadt, L.L.P.

(57) ABSTRACT

A method and automated flight trajectory prediction and flight trajectory-borne automated delay risk-transfer system related to airspace risks for risk sharing of a variable number of risk-exposed units by pooling resources of the risk-exposed units and by providing the risk-transfer system as a self-sufficient operatable risk-transfer system based on the pooled resources for the risk-exposed units by a resource-pooling system associated with the risk-transfer system. The risk-exposed units are connected to the risk-transfer system by a plurality of payment-transfer devices configured to receive and store payments from the risk-exposed units for the pooling of their risks and resources, and an automated transfer of risk exposure associated with the risk-exposed units is provided by the risk-transfer system.

25 Claims, 8 Drawing Sheets

(51) Int. Cl.
*G05D 1/00* (2006.01)
*G05D 1/10* (2006.01)
*G06N 5/04* (2006.01)
*G06Q 20/10* (2012.01)
*G06Q 20/04* (2012.01)
*G08G 5/00* (2006.01)

(52) U.S. Cl.
CPC .......... *G06N 5/04* (2013.01); *G06Q 20/0457* (2013.01); *G06Q 20/10* (2013.01); *G06Q 30/0283* (2013.01); *G08G 5/0043* (2013.01)

(56) References Cited

U.S. PATENT DOCUMENTS

| | | | | |
|---|---|---|---|---|
| 2003/0078719 | A1* | 4/2003 | Zobell | G05D 1/0204 701/120 |
| 2006/0089760 | A1* | 4/2006 | Love | G08G 5/0039 701/4 |
| 2008/0300738 | A1* | 12/2008 | Coulmeau | G01C 21/20 701/3 |
| 2009/0088972 | A1* | 4/2009 | Bushnell | G08G 5/045 701/414 |
| 2009/0112645 | A1* | 4/2009 | Jha | G06Q 10/04 705/7.12 |
| 2010/0228574 | A1* | 9/2010 | Mundinger | G06Q 10/047 705/4 |
| 2011/0166836 | A1* | 7/2011 | Kaplan | G08G 5/0043 703/2 |
| 2012/0245834 | A1* | 9/2012 | Klooster | G08G 5/0039 701/120 |
| 2012/0245964 | A1* | 9/2012 | Ortgiese | G06Q 40/08 705/4 |
| 2013/0085672 | A1* | 4/2013 | Stewart | G08G 5/003 701/528 |
| 2013/0184978 | A1* | 7/2013 | Subbu | G08G 5/0013 701/120 |
| 2014/0019032 | A1* | 1/2014 | Merl | G08G 5/0017 701/120 |
| 2014/0122213 | A1* | 5/2014 | Wong | G06Q 30/0233 705/14.33 |
| 2014/0257598 | A1* | 9/2014 | Bailey | G06F 7/00 701/3 |
| 2015/0112735 | A1 | 4/2015 | Knaust et al. | |
| 2015/0170311 | A1* | 6/2015 | Dlugosch | G08G 5/0017 705/7.12 |
| 2016/0093222 | A1* | 3/2016 | Hale | G08G 5/0021 701/120 |
| 2016/0203561 | A1* | 7/2016 | Peterson, IV | G06Q 40/08 705/4 |
| 2016/0343258 | A1* | 11/2016 | Navarro | G08G 5/0052 |
| 2017/0301247 | A1* | 10/2017 | Sherry | G06N 7/005 |
| 2020/0182637 | A1* | 6/2020 | Kumar | G06Q 50/14 |

OTHER PUBLICATIONS

Tielrooij et al., "Predicting Arrival Time Uncertainty from Actual Flight Information", Oct. 2016, Available at: https://www.researchgate.net/publication/283861651_Predicting_arrival_time_uncertainty_from_actual_flight_information/link/5651c82508ae4988a7aeb72f/download. (Year: 2016).*

International Search Report dated Mar. 9, 2017.

* cited by examiner

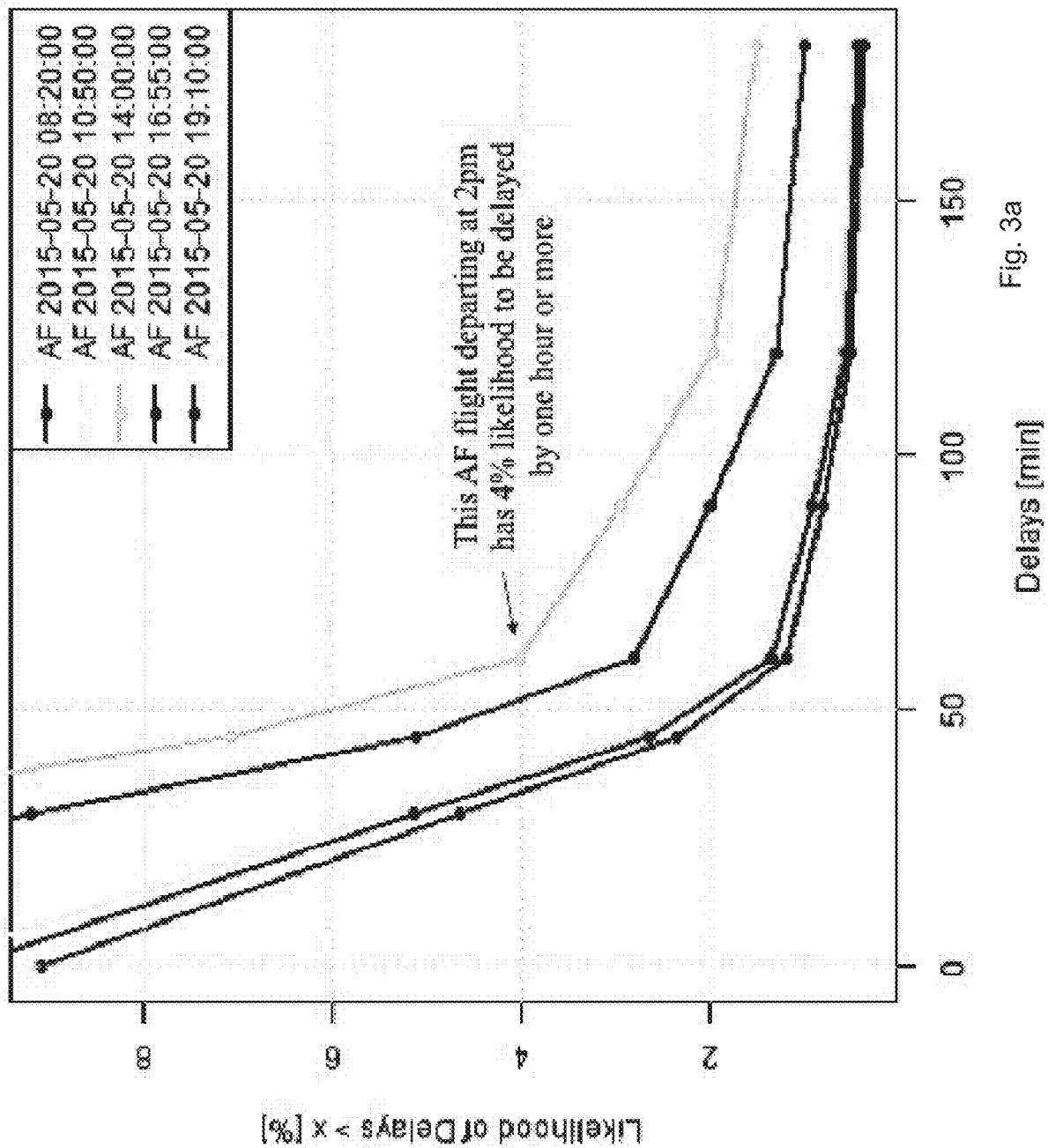

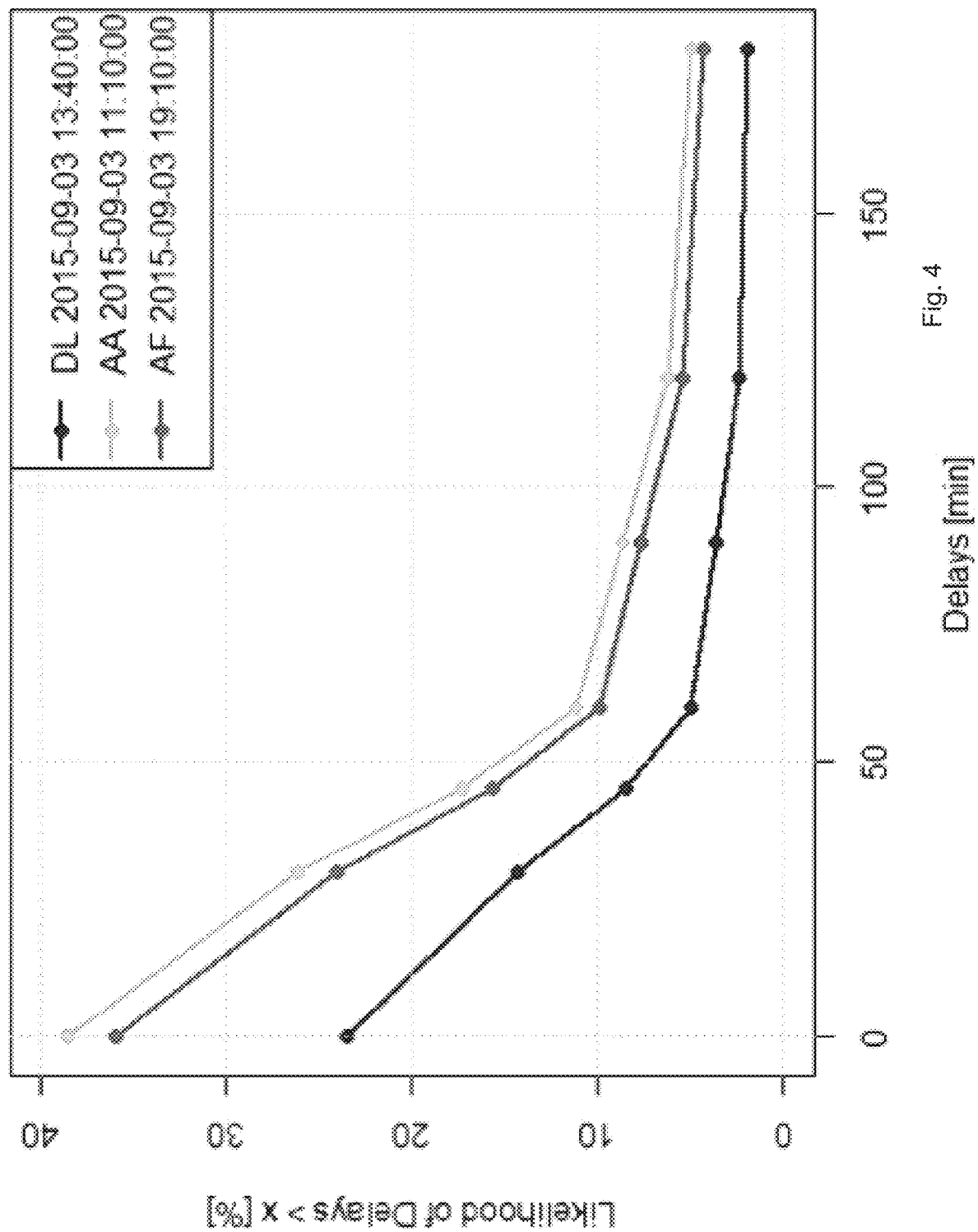

FLIGHT TRAJECTORY PREDICTION SYSTEM AND FLIGHT TRAJECTORY-BORNE AUTOMATED DELAY RISK TRANSFER SYSTEM AND CORRESPONDING METHOD THEREOF

CROSS-REFERENCE TO RELATED APPLICATIONS

This application is a continuation of International Application No. PCT/EP2016/082671 filed on Dec. 23, 2016; the entire contents of which are incorporated herein by reference.

FIELD OF THE INVENTION

The present invention relates to an automated flight trajectory prediction System and automated flight trajectory prediction based delay risk transfer. In particular, it relates to automated, self-sufficient and autarkical operatable risk-transfer systems sharing risks of a variable number of risk-exposed units, wherein the risk-exposed units, inter alia, refer to transported passengers or goods associated with airspace risks. Especially, it relates to appropriate signal generation for automated, self-sufficient flight-delay risk-transfer, wherein by means of the automated systems flight delay risks of a variable number of the risk-exposed units are pooled, thereby providing a self-sufficient risk protection for the risk exposure of said risk-exposed units.

BACKGROUND OF THE INVENTION

Despite the enormous growth of aviation infrastructure in all fields of aviation technology, technological developments can hardly keep pace with the fast growth and demand of air traffic. Airspace transportation is a complex interaction of airspace control and guidance systems, aircraft developments, ground infrastructure development such as airports, geographical conditions, weather conditions, local and regional traffic volume, and interacting national and territorial regulations. The level of cooperation between military and civilian aviation systems is another crucially interfering factor, as the EU model may illustrate, in which joint planning and dynamic management control are embedded within the airspace management policy framework; China, where the military leads and, by default, controls airspace only slowly yielding to civilian use; and/or other countries such as the BRIC nations (Brazil, Russia and India), with a dominant military that is reluctant to cede control of airspace claimed to be necessary for national defense. This often results in inefficient routing. However, the increase in traffic remains one of the core points, bringing the airspace systems to their limits. Over Europe alone, every day, 26,000 aircraft pass each other, with most of them taking off from or landing at one of the continent's 440 airports. Studies show that air traffic will increase by another 50% over the next ten to twenty years. Thus, the importance of air transportation has drastically increased over the last decades, and incentivized by the globalization of the markets, the quantity of goods and people transported via aircraft will further increase tremendously worldwide.

Several concepts in air traffic systems involve the use of long term prediction of aircraft trajectories as a way of ensuring efficient and/or conflict free flights from gate to gate.

The potential efficiency of technical approaches to air traffic systems requires that it be possible to check trajectories against each other to identify any conflicts between them and to allow to project them to future time units. An aircraft following an agreed trajectory can then be assured a trouble free and unperturbed flight. Preferred trajectories from several aircraft will inevitably lead to conflicts which must be resolved by constraining one or more aircraft to fly a non-optimum trajectory. Such traffic avoidance constraints may occur at any point in a trajectory and may involve changes to the lateral track, to altitudes or to timing. The aim is to modify an optimum trajectory as little as possible whilst still meeting the necessary constraints.

In the prior art, trajectory prediction is carried out either on the ground or in the aircraft, or at both places. The ground-based systems are able generate aircraft trajectories for both the controller and other assistance systems. Some concepts also allow to be based on the aircraft defining their own preferred trajectories (using internal trajectory prediction systems) from constraints sent from a responsible ground system. This preferred trajectory typically is then sent to the ground system so that the controllers can ensure that separation standards were maintained. Prior art systems partially enable to combine real and simulated aircraft trajectories to fake part in the assessment of the trajectory, for example, involving the exchange by an appropriate datalink of detailed constraints from an air traffic control system and the predicted trajectories from the aircraft. Such systems typically allow providing the prediction of nearly optimum trajectories in the presence of traffic avoidance constraints provided by the systems. The basis for any modification process in the prior art is the definition of an optimum flight in a suitable way for controlled modification. This can be done by means of accessible phase tables which describe a typical flight in terms of a series of subphases from takeoff to landing, e.g. to a level approach to the instrument landing system (ILS) intercept. Typically, the route which the aircraft is to fly is described by a constraint list based on a series of waypoints. This structure is also used in uplinks from an air traffic control system to specify constraints on the flight. Sometimes, meteorological forecasts are used to build in the effects of wind and temperature. The performance of the aircraft is simulated by specific models which provided information about thrust and drag with the aircraft flown as described in the phase table. In prior art, the modification process of the systems normally works and has to rely upon the above inputs to arrive al a trajectory prediction which was as close as possible to the original phase table but met the constraints.

However, despite the existence of more or less sophisticated prediction systems, about 12.6% of all flights nave an arrival delay exceeding 30 minutes. Thus, especially through the enormous increase of air traffic promoted, delays often become endemic to the air traffic. As mentioned, flight operations are frequently affected by a number of factors, such as weather, airspace control, mechanical problems, airplane dispatching and flight scheduling, making flight delays inevitable. To mitigate secondary damages, airlines or air transportation service agencies, or specialist risk transfer companies, such as insurance companies, have been providing a variety of flight delay insurance products to passengers or goods transported by air. Despite their various forms and different coverages, these products all, in essence, provide secondary compensation, not necessarily in cash form, when a predefined event, such as delay, cancellation, return and alternate landing, occurs with respect to the insured flight, or for a listed reason, such as that the passenger could not complete the travel as originally planned and the subsequent damage reaches a predefined degree or threshold. In the conventional way to obtain the compensation from a flight delay insurance product, a passenger needs to collect evidence of the occurrence of a predefined trigger-event covered by the insurance on his/her own, and then file an application for claims with the insurance company or other organizations that provide the product. When the application is received, whether the materials submitted by the passenger and the accident meet claim payment conditions needs to be reviewed manually and confirmed based on the agreed risk transfer. However, claim payment can only be carried out after the review and confirmation. The procedure is complex, time consuming and labor intensive from both sides, risk-transfer system and insured user or good. As a result, there is an urgent need for a system that can provide an automatable risk transfer and claim settlement system for flight delays and that can quickly, accurately and conveniently provide claim settlement and payment transfer for passengers who have suffered losses due to a flight delay.

In the state of the art, AU2015202700 A1 show an example of a system for adjusting the descent trajectory of an aircraft based on appropriate trajectory predictions. The adjustment parameters of the trajectory vary with the predicted trajectories' courses. The system is enabled to automatically generate, on the ground and from recorded flight data, an effective value of a calculation parameter and a corresponding theoretical value of the calculation parameter with the help of an auxiliary performance database installed in the aircraft. The generation of the adjustment parameter values is performed for identical flight conditions where the adjustment parameters are used subsequently by an adjustment unit of the system, US2010/036545 A1 discloses an avionic system based on an earth station for automatically eliminating operating malfunctions occurring in airplanes. The avionic system and the airplanes are connected via an interface. If, by parameters transferred from sensors of the airplanes to the avionic system, an operating malfunction is detected on an airplane, the activation of a dedicated malfunction device is triggered by the avionic system to eliminate the malfunction automatically. WO00/07126 A1 discloses an avionic data system used with aircraft, wherein each aircraft has a communications unit located in the aircraft. Data can be transmitted via a cellular infrastructure from the aircraft to the avionic data system after the aircraft has landed. WO02/08057 A1 shows a system providing monitoring and data feedback to aircraft regarding the state of that aircraft, information is provided by sensors located on the aircraft about the status of the aircraft and equipment. The system provides feedback information to the aircraft based on the information received during monitoring. Furthermore, EP1426870 A2 shows a wireless aircraft data system, where an aircraft computer communicates with a plurality of aircraft systems. A ground-based computer system provides wireless remote real-time access to the aircraft systems via the wireless aircraft data system. Finally, DE19856231 A1 discloses another avionic system providing data access via satellites by bidirectionally transmitting data. The paths of the satellites and their arrangement are designed such that bidirectional transmission channels can be provided among airborne airplanes and ground-based operating centers.

The prior art documents US 2012/0245964 and WO 2010/027633 show an automated underwriting system providing flight accident risk-transfer, where the number of risk-transfers are limited for a given flight to a predefined number, as e.g. 20. The system receives information from a traveler over an input device, related to a possible risk-transfer, and automatically generates a corresponding quote to the traveler. Further, the prior art document WO 2013/126866 teaches a system for management and minimization of insurance loss, where insurance perils and insured assets are monitored, potential perils to insured assets are assessed, possible actions are determined, and selected actions are executed including damage mitigation during peril and incident management after peril, to the policyholder and/or insured assets. The system is mainly focused on managing of events and actors involved in risk-transfer loss during or after the occurrence of losses. Finally, US 2015/0112735 shows an automated risk-transfer system for transferring risk related to critical illness. The system involves a three stage trigger structure splitting the transferred risk into separated risk contribution parts. The structure of the system allows an automated application of multi-risk covers without the system collapsing during operation.

Technical Objects of the Invention

It is an object of this invention to provide a new real-time operating flight trajectory prediction system and flight trajectory-borne automated delay risk transfer system and appropriate method for such a technical system. The system should provide the technical means for a rapid and real-time generation of flight trajectories of air traffic that is able to handle an involved large numbers of aircraft, especially if complex interdependencies exist between flights and short simulation run times are required. Further, the system should overcome the problems of the prior art systems, which typically comprise an inherent tradeoff between modeling detail provided by the systems and its processing or computational speed. Prior art systems that provide detailed trajectories typically require simulation run times on the order of one second per trajectory, which does not allow a real-time monitoring a prediction of a larger region with multiple interfering trajectories. The system provided herein is developed for applications, for example in the technical field of automated risk-transfer systems, that require simulation speeds on the order of several thousand trajectories per second and modeling detail to simulate typical flight operations in airspace close to major airports also referred as terminal radar approach control airspace operations. Therefore, it is a further object of the invention, to provide a completely self-sufficient, real-time operable, dynamic and trajectories-borne flight-delay risk prediction and risk-transfer system and the technical means and method thereof, in particular, also for damages following predefined events with secondary delay impacts due to their measured occurrence. It is a further object of the present invention to provide a resource-pooling system and an appropriate method for the automated and dynamic adaptable real-time transfer of risk exposure associated delays for air transportation. The system shall provide a stable, self-sufficient operation to address threats to the maintenance of the long-time operation of the system, as well as to threats undermining the operation of the system and/or limiting its ability to meet the set objectives. It should be capable of implementing appropriate and effective automatable risk transfer features, and broadly adopt the necessary technical approach. It is yet a further object of the present invention to provide a system that enhances, through its stable automated risk transfer and management structure, the system's credibility and lowers risk through improved operations and increased sustainability, which allows the systems to be operated at low operational risk.

SUMMARY OF THE INVENTION

According to the present invention, these objects are achieved particularly through the features of the independent claims. In addition, further advantageous embodiments follow from the dependent claims and the description.

According to the present invention, the above-mentioned objects are particularly achieved in that for the automated flight trajectory prediction system and flight trajectory-borne automated delay risk-transfer system related to airspace risks for risk sharing of a variable number of risk-exposed units by pooling resources of the risk-exposed units and by providing a self-sufficient operatable risk-transfer system based on the pooled resources for the risk-exposed units by means of a resource-pooling system associated with the reactive system, wherein risk-exposed units are connected to the system by means of a plurality of payment-transfer modules configured to receive and store payments from the risk-exposed units for the pooling of their risks and resources, and wherein an automated transfer of risk exposure associated with the units is provided by the flight trajectory-borne automated delay risk-transfer system, in that the system comprises monitoring means to capture or measure air data parameters of aircraft controllers and/or ground-based flight controllers of airports or flight control systems, wherein by means of a filter module the monitored air data parameters are filtered for the detection of flight indicators indicating predicted or actual flight time parameters assigned to a specific flight trajectory of an aircraft, in that the aircraft controllers and/or the ground-based flight controllers are linked via a communication network to a core engine of the predictive system, wherein a trigger module of the core engine is dynamically triggering on said data flow pathway via the communication network, in that the trigger module comprises a flight trigger for triggering and filtering predicted flight trajectories generated by the core engine based on the measured air data parameters and flight indicators associated with the generated predicted flight trajectories, wherein in case of a triggering of an exceeding of the defined time-delay threshold value, operational parameters of the triggered flight trajectory of an aircraft comprising at least flight delay parameters and flight identification are captured and stored to a table element of a selectable trigger-table assigned to the flight identifier of an aircraft, and in that for each triggered occurrence of a time delay associated with a specific flight trajectory, a corresponding trigger-flag is set by means of the core engine to all risk-exposed units assignable to that specific flight trajectory, and a parametric transfer of payments is allocated to each trigger-flag, wherein said allocation of the parametric transfer of payments to the corresponding trigger-flag is automatically activated by means of the system for a dynamically scalable loss covering of the risk-exposed unit with a definable upper coverage limit, wherein the payments are automatically scaled based on the likelihood of said risk exposure of a specific flight trajectory, the system checking and monitoring the risk accumulation and determining the payment dynamically based on the total risk accumulated and based on defined travel parameters, and wherein a loss associated with the triggered time delay is distinctly covered by the system based on the respective trigger-flag and based on the received and stored payment parameters from the pooled risk-exposed units by the parametric payment transfer from the system to the corresponding risk-exposed units by means of payment-transfer modules operated or steered by a dynamically generated output signal of the system. For example, for the prediction of the flight trajectories, the system can dynamically generate a 3D grid network table representing digitized airspace, where each grid point is a location of weather measure parameters, and generates cubes around these grid points, so the entire airspace is represented by a dynamically generated set of cubes, wherein each cube is defined by its centroid, the original grid point, and associated weather measuring parameters remaining homogeneous within the generated cube during a predefined period of time. Further, the core engine can e.g. align generated raw trajectories to said set of cube centroids as fixed 3D positions independent of trajectory data, wherein form trajectories are generated as 4D joint cubes, and wherein each cube is a segment that is associated with not only spatio-temporal attributes and with the weather measuring parameters. The system can e.g. further comprise machine learning means, wherein the machine learning means are applied and trained based on predefined inference structures derived from historical measure data by applying a stochastic structure for predicting and generating the flight trajectories taking environmental uncertainties into account. The stochastic structure can e.g. be based on a Hidden Markov Model (HMM) structure. During the processing of the system, time series clustering can e.g. be applied to generate input measure parameters from an excessive set of weather parameters. The input measure parameters generated form the excessive set of weather parameters can e.g. be fed into Viterbi algorithm-based processing means. The system can e.g. solely use dynamically monitored real trajectory dataset with pertaining weather measuring parameters. Further, the automated, flight trajectories-borne system can be an automated system related to airspace risks for risk sharing of a variable number of risk-exposed units by pooling resources of the risk-exposed units and by providing a self-sufficient risk transfer system based on the pooled resources for the risk-exposed units by means of a resource-pooling system associated with the insurance system, risk-exposed units are connected to the system by means of a plurality of payment-transfer modules configured to receive and store payments from the risk-exposed units for the pooling of their risks and resources, and wherein an automated transfer of risk exposure associated with the units is provided by the automated flight delay insurance system, in that the system comprises capturing means to receive transmitted air data parameters of aircraft controllers and/or ground-based flight controllers of airports or flight control systems, wherein by means of a filter module, the transmitted air data parameters are filtered for the detection of flight indicators indicating predicted or actual flight time parameters assigned to a specific flight or flight trajectory of an aircraft, in that the System comprises a trigger module dynamically triggering the filtered flight time parameters via a data flow pathway of the aircraft controllers and/or the ground-based flight controllers by means of a predefined time-delay threshold value, wherein the aircraft controllers and/or the ground-based flight controllers are linked via a communication network to a core engine, wherein the trigger module is dynamically triggered on said data flow pathway via the communication network, and wherein in case of a triggering of an exceeding of the design time-delay threshold value, operational parameters of the triggered flight or flight trajectory of an aircraft comprising at least flight delay parameters and flight identification are captured and stored to a table element of a selectable trigger-table assigned to the flight identifier of an aircraft, and in that for each triggered occurrence of a time delay associated with a flight or flight trajectory, a corresponding trigger-flag is set by means of the core engine for all risk-exposed units assignable to that flight, and a parametric transfer of payments is allocated to each trigger-flag, wherein said assignment of the parametric transfer of payments to the corresponding trigger-flag is automatically activated by means of the system for a dynamically scalable loss covering of the risk-exposed unit, and wherein a loss associated with the triggered time delay is distinctly covered by the system based on the respective trigger-flag and based on the received and stored payment parameters from the pooled risk-exposed units by the parametric payment transfer from the system to the corresponding risk-exposed units by means of an automated activated damage recovering system or payment-transfer modules operated or steered by a generated output signal of a failure deployment device of the system. The invention has, inter alia, the advantage that the system provides the technical means to provide a self-sufficient automated risk protection for risk sharing of a variable number of risk exposed passengers or goods to be transported by aircraft. The inventive system allows for a fully automated and fast risk transfer. Further, the behavior of the system is completely predictable, since it provides a parametric payment transfer that pays a predetermined amount of money if a predefined delay trigger is breached. With the present system, there is no hassle to claim the insurance loss coverage; passengers will simply receive a notification via cell phone making benefits available to pay for immediate needs immediately after the delay is confirmed. In contrast to the prior art system, the present system provides a dedicated standalone delay risk transfer on top of any other coverage from airlines and/or credit card companies (in contrast to the prior art systems on the market that are 'complementary' in the sense that payment transfer only covers the portion of the loss that is not covered by the airline). A further advantage is that the system is able to react to and cover short delays, wherein the design threshold trigger value can be defined as low as a 1-hour delay, for instance (traditional travel risk transfer systems can usually compensate passengers only for delays >6 hours). The present invention is streamlined and completely transparent to possible users. There is no unnecessary expensive bundling of medical, accident, hijacking, unemployment, lost baggage and/or death insurance with different deductibles for each type of risk. In addition, the present invention can be realized much less expensively than traditional travel insurance systems because if 1) is lean and 2) relies on a sophisticated pricing algorithm (accurate risk-based pricing: thus, risk premium is lower than if calculated with plain historical delay data). Finally, although the system doesn't solve delays, it makes delays automatically compensable for stranded/delayed passengers. Clearly, starting from prior art systems, there is no possibility of producing a systems like the described inventive system, since they are not able to generate the data to weight and price the coverages and customize them accurately (e.g. multiple thresholds) in order to provide a self-sufficient system. The present invention allows for a new way of automated dynamically reacting pricing method and system, whereas the price, i.e. the resources to be pooled, for a flight delay risk-transfer and insurance is differentiated for every single flight, enabled to dynamically take into account a vast set of historical data. This is done using the below described statistical method steps and applying "Big Data" techniques. The system is able to dynamically react on various factors, especially the factors departure and arrival airport, airline/carrier, aircraft type, time of departure and arrival, weekday, month, holidays etc., but also flight density at arrival and destination airport at the time of departure and arrival. In addition, scheduled block times (the planned duration of the flight, which is an important determinant of delays) are considered in deriving the delay probabilities and eventually the prices of flight delay insurance (list is non-exhaustive). Related to the dynamic pricing, in addition to the historical delay performance, real time and prospective data is considered in the pricing processing. For example, future scheduled block time data and changes (airlines are scheduling their flights one year ahead), real time weather, weather forecasts and air traffic data, notice to airmen (NOTAM, a system informing about current and planned/future limitations/restrictions in the use of airspace, navigation facilities, airports etc.) are used for predicting delay probabilities and eventually the prices (the list of forward looking information is also non-exhaustive). This requires a permanent update of all the relevant information, which is fed into the pricing processing and system's algorithms. Thus, the present system allows by means of a dynamic pricing to improve pricing accuracy significantly over comparable electronic prior art system. Thus, in the prior art systems, the generated prices are necessarily uniform in the sense that they are not differentiated for different flights, routes and airlines, prices are based on crude average delay probabilities. With the dynamic pricing capability of the present, the prices are differentiated for specific flights, taking into account a vast set of historical data, prospective flight plan data (so called scheduled block times which is an important determinant of delays) and real time weather and traffic data. Because of that, the inventive dynamic pricing results in much higher pricing accuracy, which effectively aligns insurance prices (premium rates) with the underlying risks. I.e., the risk is in two ways dynamically adapted by the central system 1. First of all, the accumulation of the risk is centralized controlled and adapted for each additional risk transfer performed by the system 1, and secondly, the transferred risk is adapted for each single transferred risk by weighting the transferred resources, which is the dynamic pricing for each single risk. This also allows for providing pricings of the risk transfer in dependency of the time delay to departure. A risk transfer performed one month in advance has a much higher uncertainty, as one performed 2 days before departure. Further advantages are (1) that passengers cannot bet against insurance companies by buying flight delay risk transfers or insurances only for flights that they know have higher likelihood of having a delay (less anti selection), which results in better and more stable operational performance of system 1; and (2) it allows to offer low delay triggers (without accurate pricing this would not be possible). Further, in the prior art systems, the necessary delay threshold for payout needs typically to be 6 hours of delay, or even more, to warrant a stable performance of the prior art systems. The present invention (i) allows implementing automated trigger as low as 30', and (ii) allows combining multiple triggers, e.g. a claim can be triggered at departure and on arrival, which is not possible by the static prior art systems. Risk transfers with low delay triggers require much more sophisticated pricing approaches such as our dynamic pricing. Traditional travel insurance system in fact have high triggers because they lack accurate pricing systems, which require sound data, proper recognition and understanding of delay patterns, inclusion of real lime and prospective data etc. Another deficiency of the prior art system is, that a policyholder typically has to claim, i.e. file and submit a claim. In contrast, the inventive, parametric system allows a fully automated claim processing e.g. via cell phone, wherein no action/request from policy is required. Thus, the present automated system 1 is much more consumer friendly and does not build upon the expectation that policyholder will not claim because of high hurdles. Finally, the prior art systems only allow for a heavily delayed balancing or settlement for the risk transferred in case of the detection of a risk event, i.e, a delay, Thus, usually policyholders receive benefit days/weeks after the delay occurred. Sometimes they only receive vouchers and sometimes compensation payments by airlines are deducted from the risk transfer, i.e. insurance benefit. In contrast to the prior art systems, the present invention provides instant payment transfers within minutes when delay is triggered. The transfer can even be before boarding once it is triggered that delay will unavoidably occur. In addition, risk balancing, i.e. benefits are paid regardless of other compensation, which increases the safety of the customer. Thus, the present system 1 allows for a very consumer friendly handling of risks with a much more appealing value proposition.

In one alternative embodiment, the flight delay insurance system comprises an insurance policy data management module connected with an external sales system via a dedicated port, wherein if a flight ticket and a flight delay insurance policy are sold, the external sales system transmits insurance policy data to the insurance policy data management module to accomplish the risk transfer from the risk-exposed unit to the risk transfer and insurance system.

In a further alternative embodiment, a payment processing module of the system is connected with a third-party payment platform through a dedicated port for transmitting payment parameters, at least comprising information of a transfer-out account, information of a transfer-in account, a transfer amount, and a verification key, to the third-party payment platform, and receiving the processing result state from the third-party payment platform.

In another alternative embodiment, the parametric payment transfer from the system to the corresponding risk-exposed units is executed by electronic payment transfer to a transfer-out account associated with a mobile telephone. However, the parametric payment transfer is not bound to mobile phones. One of the advantages of the present inventions is, that the payment transfer, i.e. payout can be fully automated achieved via cell phone, but not only. It can also be realized via credit card or banks or appropriate online platforms or any other payment form of automatable electronic platforms.

In an even further alternative embodiment, the plurality of payment-transfer modules, configured to receive and store payments from the risk-exposed units for the pooling of their risks and resources, are associated with the transfer-out account of a corresponding risk-exposed unit.

In one alternative embodiment, the design time-delay threshold value is set individually for each of the risk-exposed units depending on the received and stored payments and/or resources from the risk-exposed units for the pooling of their risks.

In a further alternative embodiment, the design time-delay threshold value is set individually for each of the risk-exposed units and flights or flight trajectories.

In another alternative embodiment, the plurality of payment-transfer modules configured to receive and store payments from the risk-exposed units for the pooling of their risks and resources are assigned to an external sales system belonging to airlines or air transportation sellers, wherein the external sales system transfers a total payment for all of its sold air transportation tickets to risk-exposed units.

In an even further alternative embodiment, the external sales system transfers a covering payment only for selected segments of sold air transportation tickets to risk-exposed units.

In one alternative embodiment, an additional filter module of said core engine dynamically increments a time-based stack with the transmitted flight delay parameters based on the selectable trigger-table and activates the assignment of the parametric transfer of payments to the corresponding trigger-flag by means of the filter module if a threshold, triggered on the incremented stack value, is reached.

In a further alternative embodiment, said assignment of the parametric transfer of payments to the corresponding trigger-flag is automatically activated by means of the system for a dynamically scalable loss covering of the risk-exposed unit with a definable upper coverage limit, and wherein the payments are automatically scaled based on the likelihood of said risk exposure of a specific flight or flight trajectory.

In another alternative embodiment, the risk-transfer system comprises an assembly module to process risk-related flight or flight trajectory data and to provide the likelihood for said risk exposure of a flight or flight trajectory based on the risk-related flight or flight trajectory data wherein the risk-exposed units are connected to the resource-pooling system by means of the plurality of payment-receiving modules configured to receive and store payments associable with the pooled risk-exposed units for the pooling of their risks and wherein the payments are automatically scaled based on the likelihood of said risk exposure of a specific flight or flight trajectory.

BRIEF DESCRIPTION OF THE DRAWINGS

The accompanying drawings incorporated in and forming part of the specification illustrate several aspects of the present invention, and together with the description, serve to explain in more detail, by way of example, the principles of the invention, in the drawings:

FIG. 4 shows a diagram schematically illustrating the generation of predicted flight and flight trajectory data. The present invention is able to perform live simulations for any flight in the future for which sufficient information (operating airline, scheduled departure and block times, etc.) is captured by the system 1. The example of the chart illustrated in FIG. 4 shows the forecast of delays from CDG to JFK on Sep. 3, 2015 based on the 2014 flight calendar by means of the present system. As resulting patterns, Air France has a significantly lower Scheduled Block Time (SBT) and gets a 1-hour delay likelihood of 10%, while American Airline has a higher SBT than Air France but is penalized by other factors, namely (i) slower aircraft, (ii) different departure/arrival terminal, (iii) operational risks.

Reference will now be made to detailed examples of the present invention, which are illustrated in the accompanying drawings.

DETAILED DESCRIPTION OF THE PREFERRED EMBODIMENTS

Figure 1:
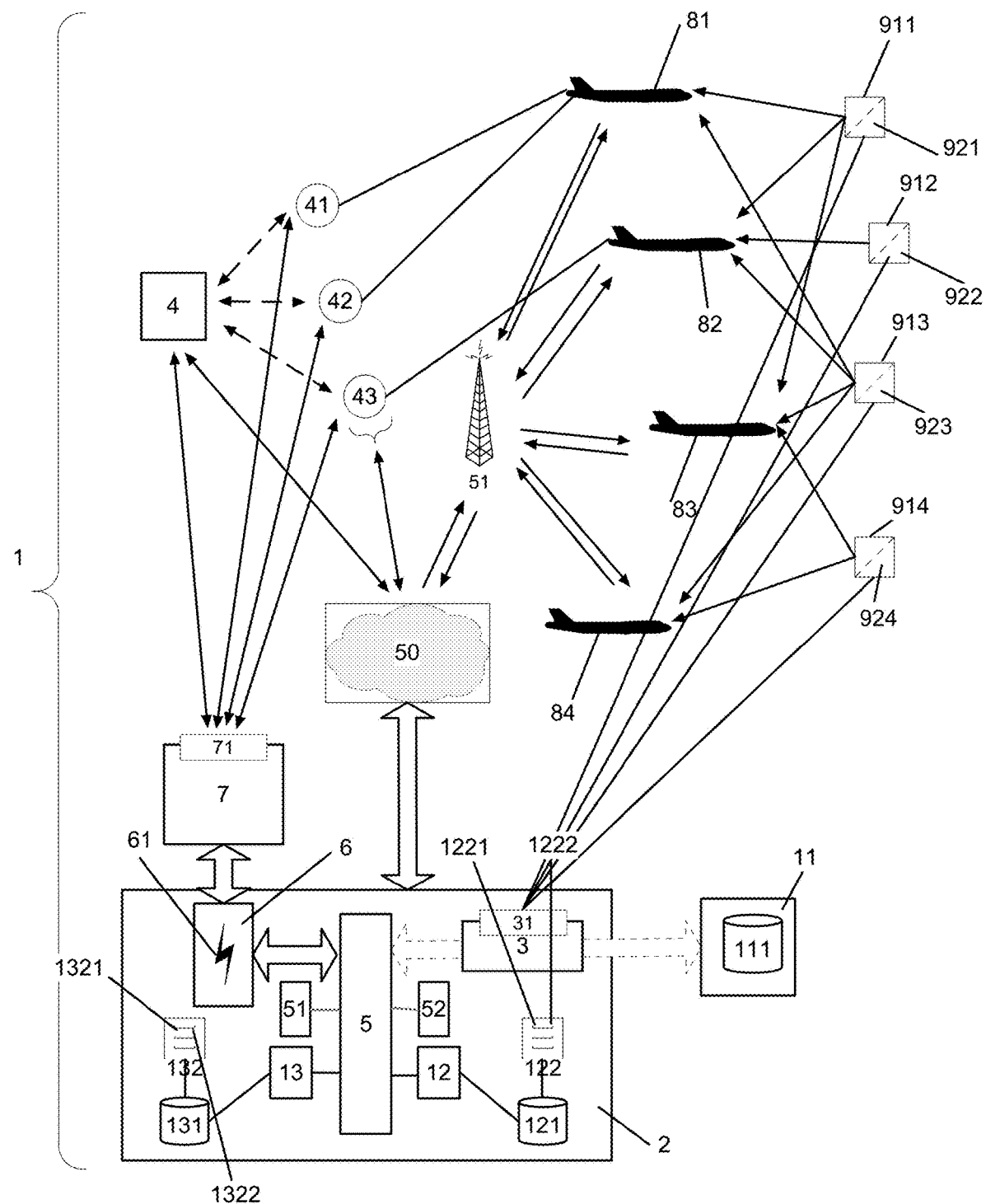
FIG. 1 shows a block diagram schematically illustrating an exemplary configuration of the underlying technical structure for the risk transfer of a trajectories-borne system 1 according to the present invention. Reference 1 refers to a system according to the invention, i.e., a self-sufficient operatable, automated flight-delay risk transfer and insurance system, reference 2 to a core engine, 3 to a trigger module, 4 to an air transportation seller system, 5 to an appropriately realized filter module, 6 to a failure deployment device generating a technical output or activation signal, and 7 to a payment-transfer module signaled, operated and steered by the system 1 or the core engine 2 of system 1.
Figure 2:
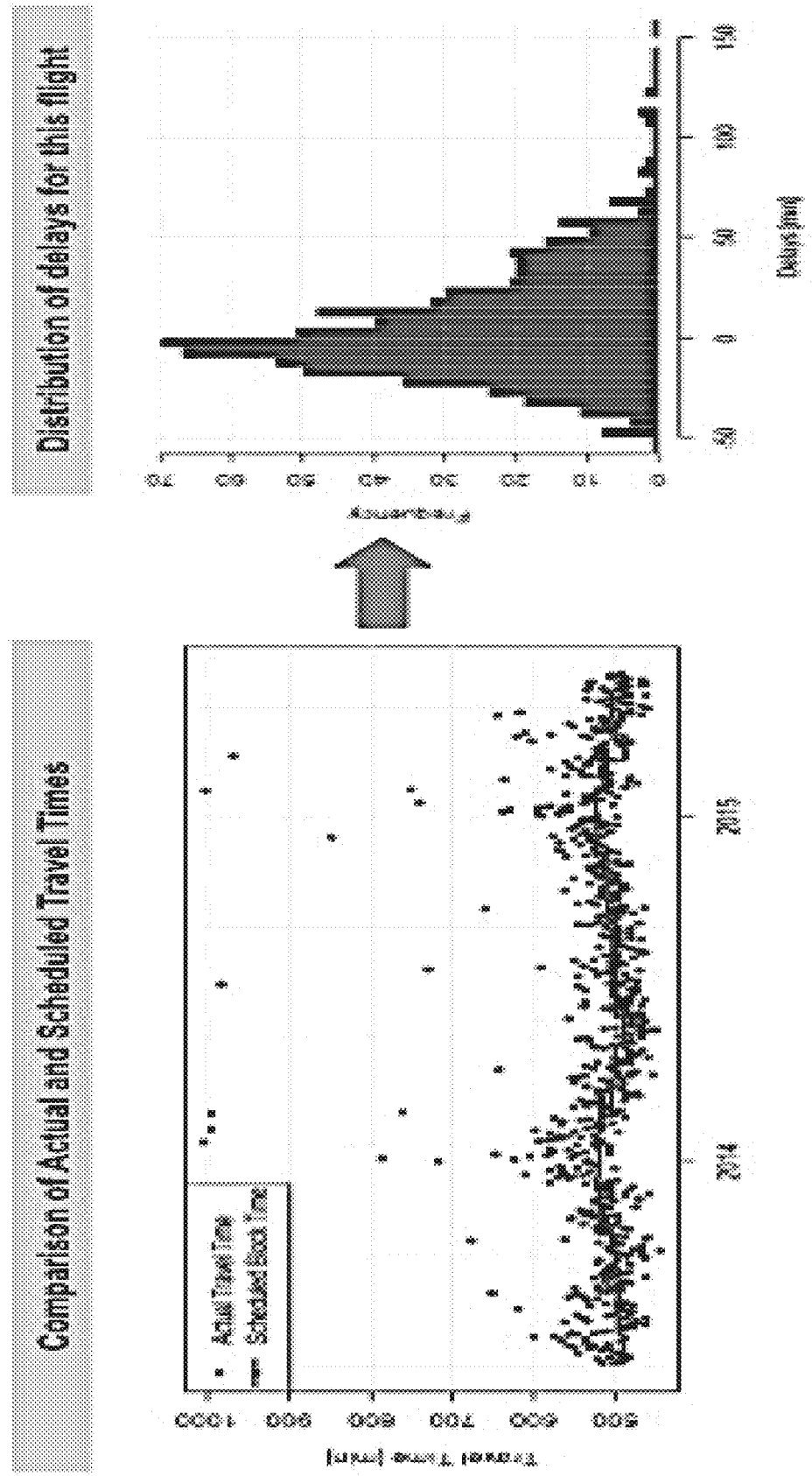
FIGS. 2 (2a, 2b, and 2c) show a diagram schematically illustrating an example of delay patterns measured for Delta Air Lines flights from Paris (Charles De Gaulle) to New York (J.F. Kennedy). Extracting and finding the delay pattern is complex. As illustrated, the actual travel time exhibits a clear yearly seasonality, with longer times in winter. However, this seasonality is only partially anticipated by the scheduled block time announced by Delta Air Lines.
Figure 2A:
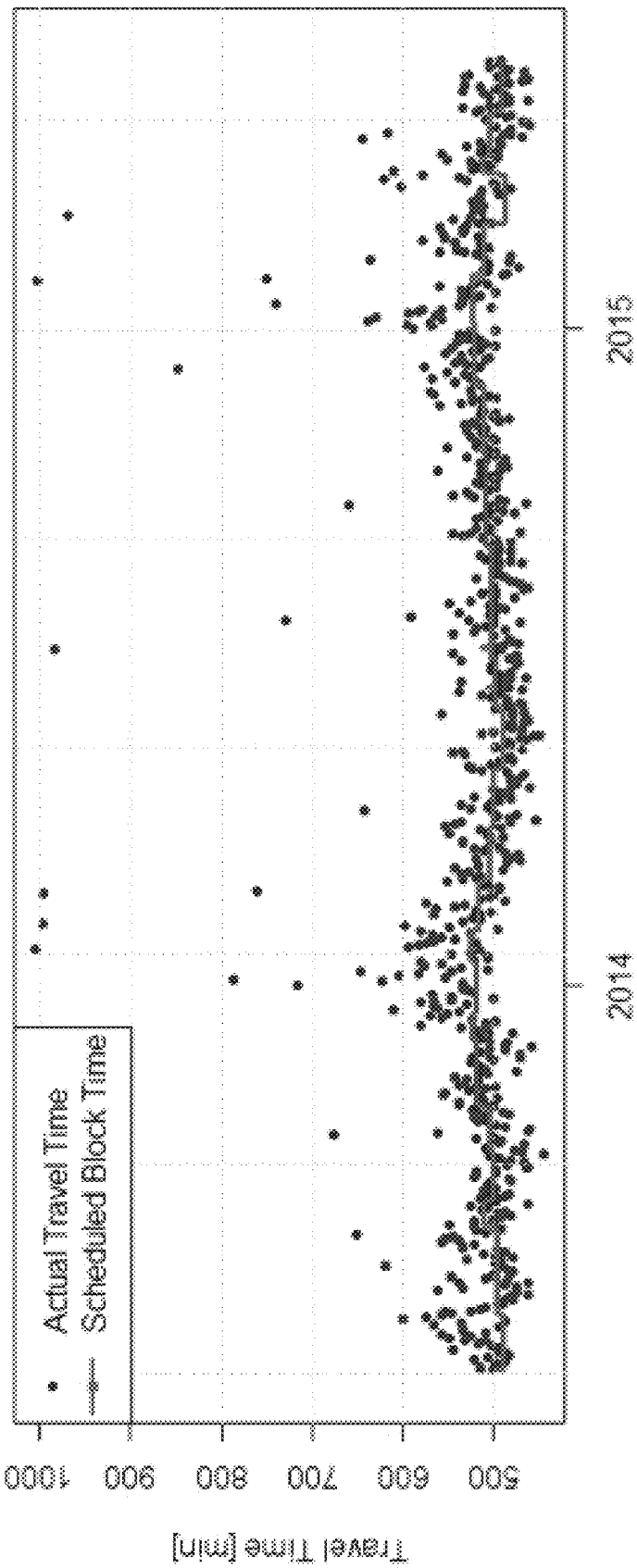
Figure 2B:
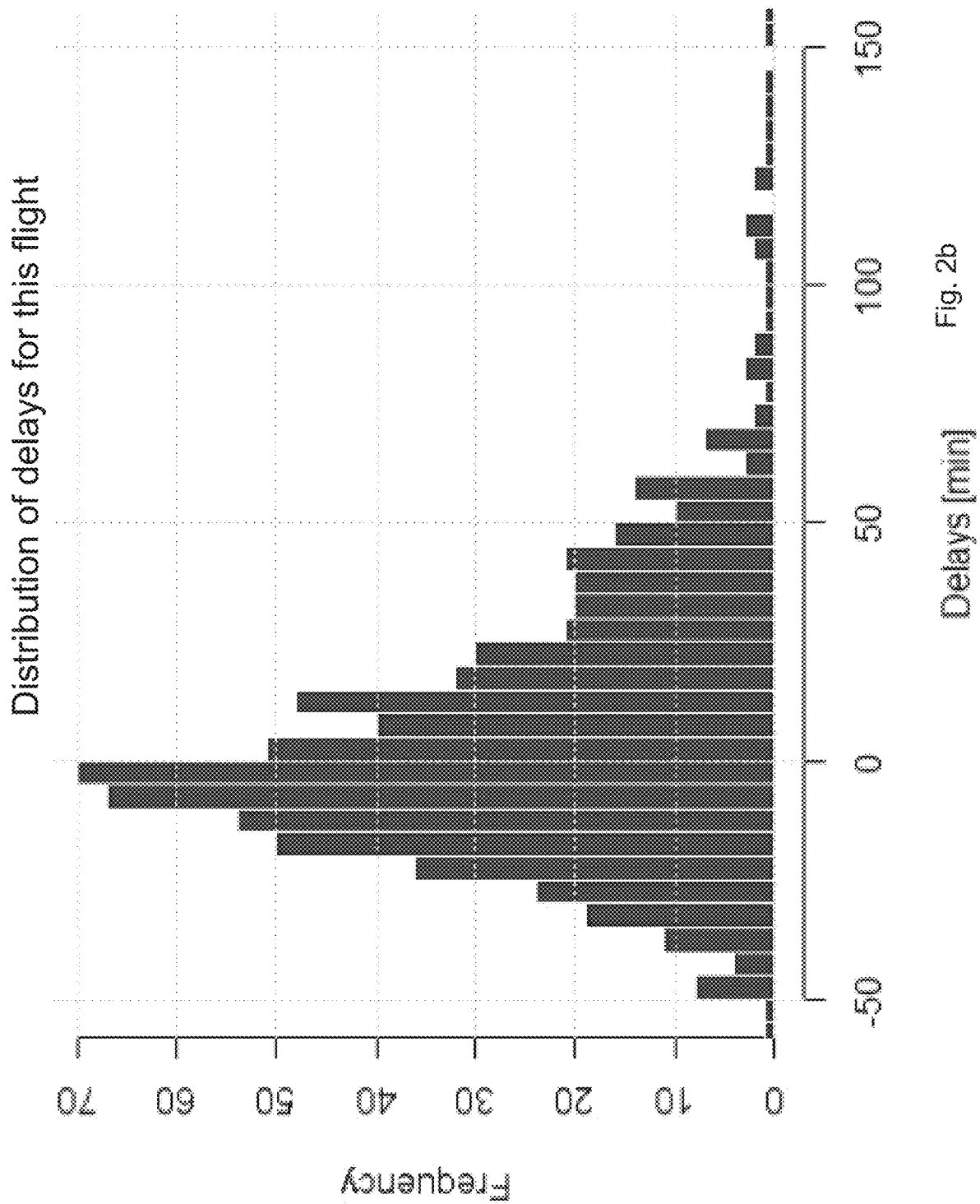
Figure 3B:
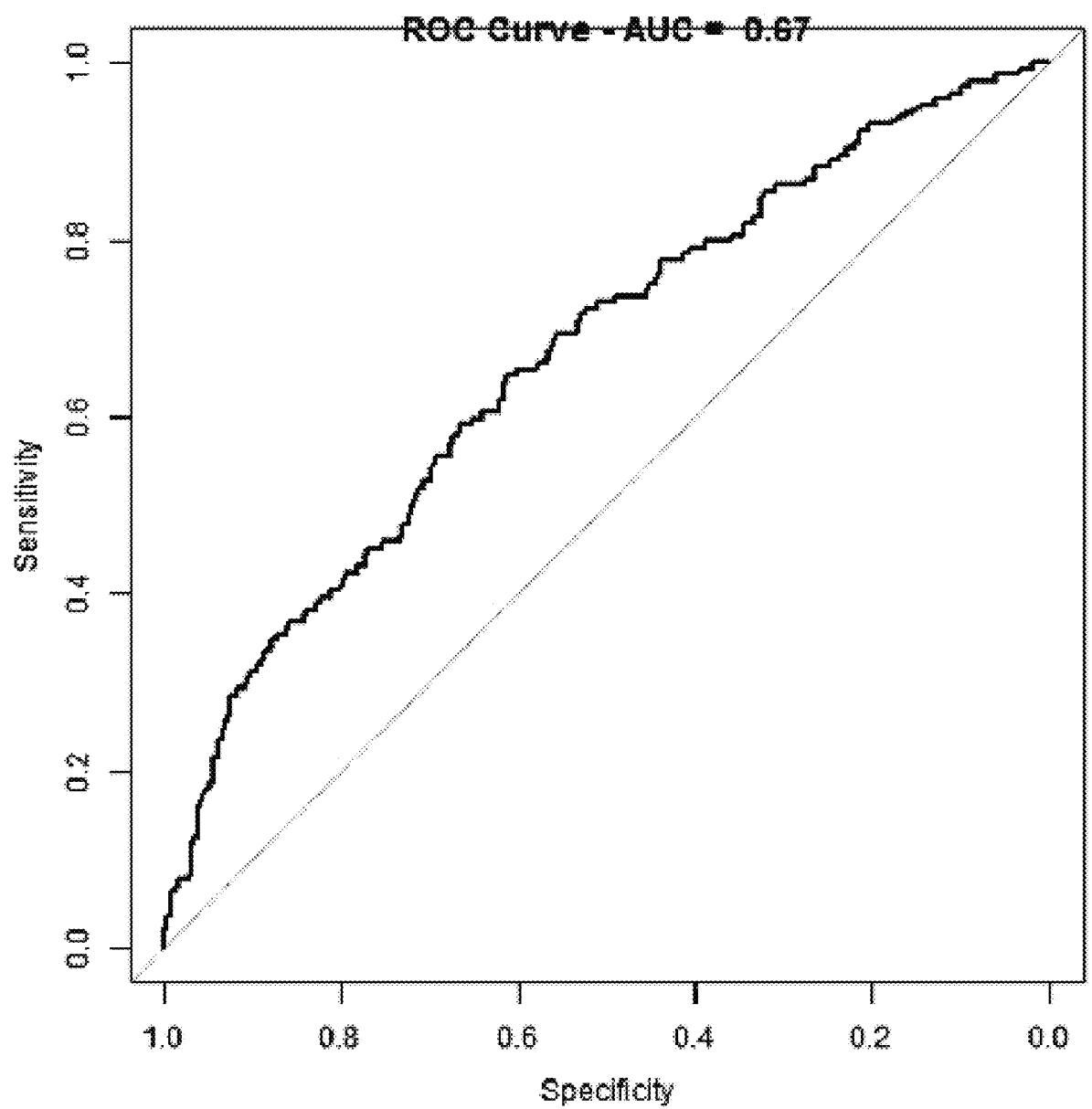
FIGS. 3 (3a and 3b) show a diagram schematically illustrating a model analysis of the realization by means of the present invention. As shown on the left side of the illustration, for the realization of the present invention, a regression approach is used to generate total travel time vis-à-vis factors characterizing each flight, such as (i) calendar indicators: Month of the year, day of the week, hour of the day, holidays periods, (ii) Airport-based information: Flight departure and arrival densities, terminal number, and (iii) Flight-specific: Aircraft type, operator, capacity. For the accuracy approach of the present invention, as illustrated on the right side, the mean forecasted likelihood is compared with the achieved ratio of the delayed plane. As an example, the achieved delay ratio on flights from CDG to JFK is 11.5%, while the mean forecasted value is 11%. The present invention uses ROC (Receiver Operating Characteristic) curves to measure the classification accuracy for the forecasts on a specific route only for one specific threshold, e.g., 60 minutes. The present invention provides an accurate and stable operation. As an example, the ROC curve for CDG to JFK flights using a 60-minute delay threshold is plotted in FIG. 3.
Figure 5:
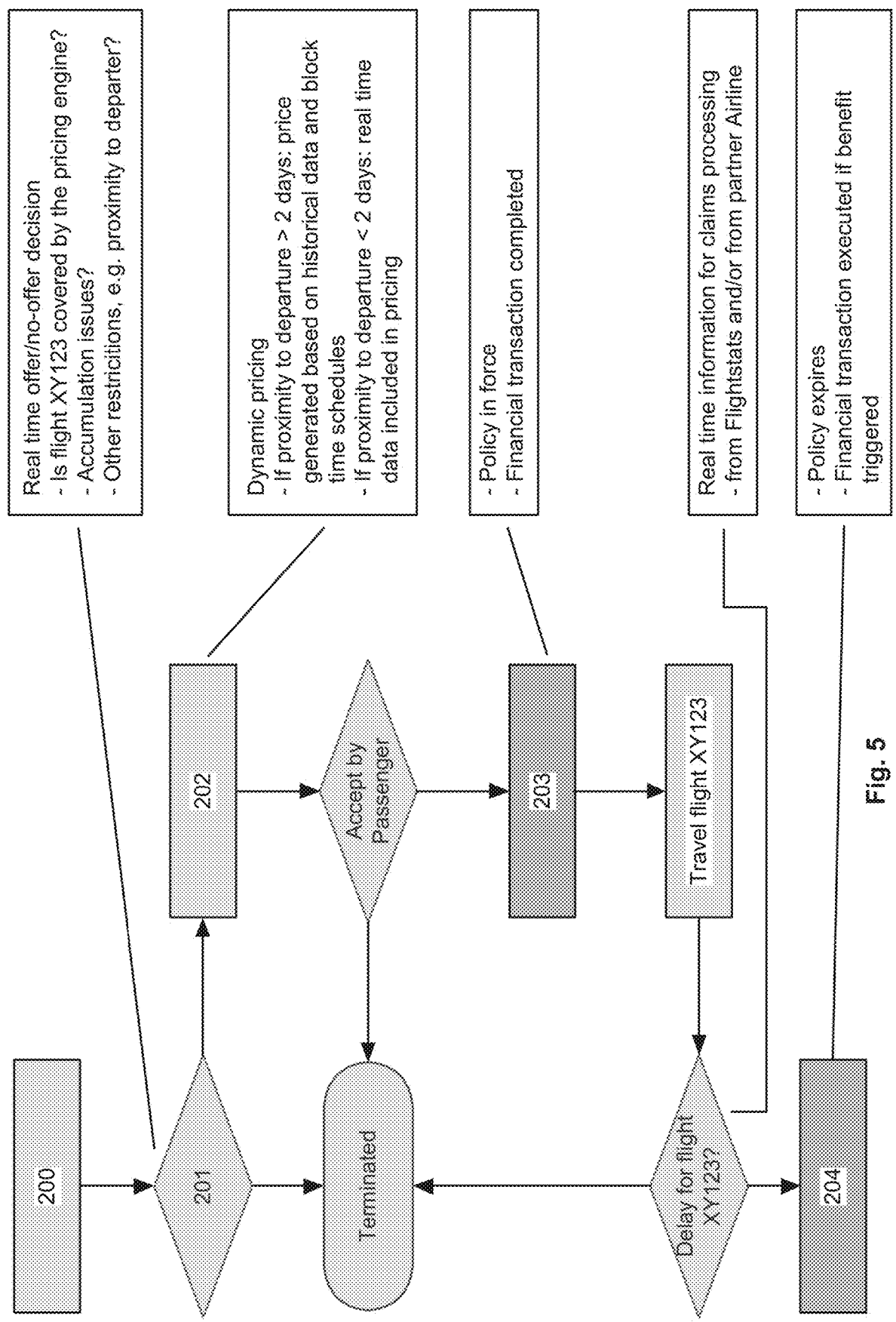
FIG. 5 shows a diagram schematically illustrating an example workflow and processing cycle for the present invention. Reference numeral 200 denotes the step of buying a ticket for flight XY123 online, wherein a risk transfer for flight delays with an associated flight delay insurance offered; in 201, the system 1 monitors and checks the risk accumulation: system 1 capacity limits ok?: if yes, system 1 generates in step 202 specific offer data set(s) for flight XY123, i.e. the pricing is dynamically determined based on the total risk accumulated and based on travel parameters as time to departure, place, measured weather conditions etc.; in step 203, if the risk transfer is accepted by the system 1, the electronic clearing and billing steps are performed by the system 1, i.e. the insurance is bought, e.g. by charging the dynamic premium to credit card or by other electronic charging mechanism. Optionally, the system 1 may generate and issue a confirmation, e.g. by sending a corresponding mail to insured; finally, in step 204, if a delay for flight YX123 is triggered by the system 1 and if the participation of the passenger is triggered (e.g. valid ticket number), system 1 generates corresponding parametric payout data and electronically performs the payment transfer e.g. via mobile money operator and/or to bank/credit card.

In FIG. 1, reference 1 refers to an automated flight trajectory prediction system 1 and flight trajectory-borne automated delay risk-transfer system 1, in particular to a self-sufficient operatable automated system 1 according to the invention, reference 2 to a core engine, 3 to a trigger module, 4 to a seller service system, 5 to an appropriately realized filter module, 6 to a failure deployment device generating a technical output or activation signal, and 7 to a payment-transfer module with data transmission interlace 71 or to an automated activated damage recovering system, wherein both are operated or steered by the output signal generated by the system 1. The system 1 technically transfers, captures and handles risks as a consequence of flight-delay events by providing loss coverage for the transported risk-exposed units 41, . . . , 43 based on pooled resources and risks. The risk-exposed units 41, . . . , 43 can be passengers or goods, transported by a certain flight and aircraft. The underlying reasons leading to the flight delay are not relevant for the operation of the present system, i.e., they can comprise, inter alia, measurable based on atmospheric conditions (example: volcanic ash), meteorological conditions (example: flood, earthquake, storm, wind, rain), heavy air traffic, technical problems of the aircraft or airport systems, etc. The technical approach of the system is therefore related only to the recognizable nature of the flight patterns. However, as FIG. 2 shows using the example of delay patterns measured for Delta Air Lines flights from Paris (Charles De Gaulle) to New York (J.F. Kennedy), extracting and finding the delay pattern is complex. As illustrated in FIG. 2, the actual travel time exhibits a clear yearly seasonality, with longer times in winter. However, this seasonality is only partially anticipated by the scheduled block time announced by Delta Air Lines. As shown on the left side of FIG. 3, for the realization of the present system 1, a regression approach is used to generate total travel time vis-à-vis factors characterizing each flight, such as (i) calendar indicators: Month of the year, day of the week, hour of the day, holidays periods, (ii) Airport-based information: Flight departure and arrival densities, terminal number, and (iii) Flight-specific: Aircraft type, operator, capacity. For the accuracy approach of the present invention, as illustrated on the right side, the mean forecasted likelihood is compared with the achieved ratio of the delayed plane. As an example, the achieved delay ratio on flights from COG to JFK is 11.5%, while the mean forecasted value is 11%. The system 1 uses ROC (Receiver Operating Characteristic) curves to measure the classification accuracy for the forecasts on a specific route only for one specific threshold, e.g., 60 minutes. The system 1 provides an accurate and stable operation. As an example, the ROC curve for CDG to JFK flights using a 60-minute delay threshold is plotted in FIG. 3. The system 1 is able to perform live simulations for any flight in the future for which sufficient information (operating airline, scheduled departure and block times, etc.) is captured by the system 1, as FIG. 4 shows. The example of the chart illustrated in FIG. 4 shows the forecast of delays from CDG to JFK on Sep. 3, 2015 based on the 2014 flight calendar by means of the present system. As resulting patterns, Air France has a significantly lower Scheduled Block Time (SBT) and gets a 1-hour delay likelihood of 10%, while American Airlines has a higher (SBT) than Air France but is penalized by other factors, namely (i) slower aircraft, (ii) different departure/arrival terminal, (iii) operational risks.

The flight trajectory-borne automated delay risk-transfer system 1 provides risk sharing of a variable number of risk-exposed units 41, . . . , 43 by pooling resources of the risk-exposed units 41, . . . , 43 and by providing a self-sufficient risk-transfer system 1 based on the pooled resources 11 for the risk-exposed units 41, . . . , 43 by means of a resource-pooling system 11 associated with the insurance system 1. The risk-exposed units 41, . . . , 43 are connected to the system 1 by means of a plurality of payment-transfer modules 7 configured to receive and store payments from the risk-exposed units 41, . . . , 43 for the pooling of their risks and resources 111. Thus, the automated flight-delay insurance system 1 provides an automated transfer of risk exposure associated with the units 41, . . . , 43 by its technical means and realization. The reactive flight delay insurance system 1 operates by means of the core engine 2 as centralized risk steering and management cockpit device distinctively and dynamically steering the cover by means of the core engine 2, wherein the distribution of the risk is dynamically adapted by the system 1 and/or the capacity is dynamically or statically limited per airline and/or per airport or rejecting the cover in case of material risk changes or change the pricing mechanism. The resources transferred from the risk-exposed units 41, . . . , 43 for pooling the risk are dynamically adapted for each single transferred risk at least in dependency of the time threshold to the departure of the flight, wherein a resource based uncertainty factor is scaled dynamically down in dependency to the time threshold to the departure of the flight. The adaption can e.g. be performed on each transmitted request of a risk-exposed units 41, . . . , 43 to the system 1 for risk pooling and transfer.

The system 1 comprises capturing means 31 to receive transmitted air data parameters 102, 202 of aircraft controllers 911, . . . , 914 and/or ground-based flight controllers 921, . . . , 924 of airports or flight control systems. Aircraft controllers 911, . . . , 914 are electronic systems with sensors providing a large quantity of technical information data and operational data of an aircraft. Aircraft controllers 911, . . . , 914, like so called flight management systems (FMS), are a fundamental component of a modern airliner's avionics. FMSs typically comprises a specialized computer system that automates a wide variety of in-flight tasks, A primary function is in-flight management of the flight plan. Using various sensors (such as GPS (Global Positioning System) and INS (Inertial Navigation System) often backed up by radio navigation) to determine the aircraft's position, the EMS can guide the aircraft along the flight plan. From the cockpit, the EMS is normally controlled through a Control Display Unit (CDU). The EMS sends the flight plan for display to the Electronic Flight Instrument System (EFIS), Navigation Display (ND), or Multifunction Display (MFD). However, the aircraft controllers 911, . . . , 914, according to the present invention may comprise all kinds of aircraft avionics, such as communication systems, navigation systems, monitoring systems, aircraft flight-control systems, collision-avoidance system, black box data systems, weather systems and/or aircraft management systems, i.e., generally avionics used as electronic systems on aircraft, artificial satellites, and spacecraft. Thus, aircraft controllers 911, . . . , 914 comprise communications, navigation, electronic display and management of multiple systems, and all varieties of systems that are fitted to aircraft to perform individual functions. These can be as simple as a control of a searchlight for a police helicopter or as complicated as the tactical system for an airborne early warning platform. The term aircraft controllers 911, . . . , 914, as used in the present invention, refers to all kinds of avionics as a hybrid of the words aviation and electronics.

Ground-based flight controllers 921, . . . , 924, such as air traffic controllers, can comprise systems for maintaining the safe flow of air traffic in the global air traffic control system. Air traffic controllers, i.e., air traffic control systems, are typically based on implemented separation rules to keep aircraft at a safe distance from each other in their area of responsibility and move all aircraft safely and efficiently through their assigned sector of airspace, as well as on the ground. Air traffic data is thus analyzed based on said implemented separation rules. Air traffic control systems capture data from at flights and flight trajectories in their sector. It bears mentioning that so-called Air Traffic Control (ATC) provided by ground-based controllers may electronically direct aircraft on the ground and through controlled airspace, but do not provide control to aircraft in non-controlled airspace. The primary purpose of ATC systems worldwide is to prevent collisions, organize and expedite the flow of traffic, and provide information and technical data to pilots or any associated systems. It is also of note that in some countries, data access to ATC systems is difficult, since in these countries ATC systems play a security or defensive role, or are operated by the military. In non-controlled airspace or airspace zones with restricted access to ATC data, predicted or extrapolated flight and flight trajectory data 121 is used by the system 1. Apart form ground-based flight control systems 921, . . . , 924, the aircraft flight control systems 911, . . . , 914 also provide data, whereas the system 1 of the present invention can trigger in both data pathways. Aircraft flight control systems 911, . . . , 914 typically consist of flight control surfaces, the respective cockpit controls, connecting linkages, and the necessary operating mechanisms to control an aircraft's direction in flight. Aircraft engine controls are also considered to be flight controls as they change speed. Thus, the data used and captured by the aircraft flight control systems 911, . . . , 914 comprises all relevant operational data of the aircraft during its flight.

By means of the filter module 5, the transmitted air data parameters 121 are filtered for the detection of flight indicators indicating predicted or actual flight time parameters 1231, 1232, . . . , assigned to a specific flight or flight trajectory 1221, 1222, . . . , of an aircraft 81, . . . , 84. For the air data parameters, the system 1 can further comprise capturing means to receive transmitted flight plan parameters of the aircraft 81, . . . , 84 transporting pooled risk-exposed units 41, . . . , 43. The flight plan parameters at least comprise airport indicators and parameters making it possible to determine the frequency of the approaches and/or landings and/or departures of aircraft for a specific aircraft or aircraft fleet 81, . . . , 84. The flight plan parameters are in general a set of measurable factors that make it possible to determine the operation of a specific aircraft or aircraft fleet 81, . . . , 84 and determine the planned behavior of the aircraft, such as the aforementioned approach and/or landing and/or departures indicators of airports, also possibly comprising other flight parameters including ground sampled distance (GSD), longitudinal overlap degree (xp), side overlap degree (q), overflight parameters for specific regions, parameters of Air Traffic Control (ATC) decision support fools including associated parameters for the prediction or planning of four-dimensional (time-related) aircraft trajectories, linked aircraft state data, predicted atmospheric state data and/or any flight intent data and/or parameters related to approach and landing systems or ground control systems.

The system 1 comprises a trigger module 3 dynamically triggering the filtered flight time parameters 1221, 1222, . . . via a data flow pathway of the aircraft controllers 911, . . . , 914 and/or the ground-based flight controllers 921, . . . , 924 by means of a predefined time-delay threshold value. The aircraft controllers 911, . . . , 914 and/or the ground-based flight controllers 921, . . . , 924 are linked via a communication network 50 to a core engine 2. The trigger module 3 is dynamically triggered on said data flow pathway via the communication network 50. If an excess of the design time-delay threshold value is triggered, operational parameters of the triggered flight or flight trajectory 1221, 1222, . . . of an aircraft 81, . . . , 84 comprising at least flight delay parameters 1322, 1332, . . . and flight identification 1321, 1331, . . . are captured and stored to a table element 132, 133, . . . of a selectable trigger-table 13 assigned to the flight identifier 1321, 1331, . . . of an aircraft 81, . . . , 84. The design time-delay threshold value can, for example, be set individually for each of the risk-exposed units 41, . . . , 43 depending on the received and stored payments and/or resources from the risk-exposed units 41, . . . , 43 for the pooling of their risks. Furthermore, the design time-delay threshold value can also be set individually for each of the risk-exposed units 41, . . . , 43 and flights or flight trajectories 1221, 1321.

This means, the system 1 comprises monitoring means 31 to capture or measure air data parameters 102, 202 of aircraft controllers 911, . . . , 914 and/or ground-based flight controllers 921, . . . , 924 of airports or flight control systems, wherein by means of a filter module 5 the monitored air data parameters 121 are filtered for the detection of flight indicators indicating predicted or actual flight time parameters 1231, 1232, . . . assigned to a specific flight trajectory 1221, 1222, . . . of an aircraft 81, . . . , 84. As discussed, the aircraft controllers 911, . . . , 914 and/or the ground-based flight controllers 921, . . . , 924 are linked via a communication network 50 to a core engine 2 of the predictive system 1, wherein a trigger module 3 of the core engine 2 is dynamically triggering on said data flow pathway via the communication network 50. The trigger module 3 comprises a flight trigger for triggering and filtering predicted flight trajectories 1221, 1222, . . . generated by the core engine 2 based on the measured air data parameters 121 and flight indicators associated with the generated predicted flight trajectories 1221, 1222, . . . , wherein in case of a triggering of an exceeding of the defined time-delay threshold value, operational parameters of the triggered flight trajectory 1221, 1222, . . . of an aircraft 81, . . . , 84 comprising at least flight delay parameters 1322 and flight identification 1321 are captured and stored to a table element 132, 133, . . . of a selectable trigger-table 13 assigned to the flight identifier 1321 of an aircraft 81, . . . , 84. For each triggered occurrence of a time delay associated with a specific flight trajectory 1221, 1321, a corresponding trigger-flag is set by means of the core engine 2 to all risk-exposed units 41, . . . , 43 assignable to that specific flight trajectory 1221, 1321, and a parametric transfer of payments is allocated to each trigger-flag, wherein said allocation of the parametric transfer of payments to the corresponding trigger-flag is automatically activated by means of the system 1 for a dynamically scalable loss covering of the risk-exposed unit 41, . . . , 43 with a definable upper coverage limit, wherein the payments are automatically scaled based on the likelihood of said risk exposure of a specific flight trajectory, the system 1 checking and monitoring the risk accumulation and determining the payment dynamically based on the total risk accumulated and based on defined travel parameters, and wherein a loss associated with the triggered time delay is distinctly covered by the system 1 based on the respective trigger-flag and based on the received and stored payment parameters from the pooled risk-exposed units 41, . . . , 43 by the parametric payment transfer from the system 1 to the corresponding risk-exposed units 41, . . . , 43 by means of payment-transfer modules 7 operated or steered by a dynamically generated output signal of the system 1.

For the prediction of the flight trajectories, the system 1 can dynamically generate a 3D grid network table representing digitized airspace, where each grid point is a location of weather measure parameters, and generates cubes around these grid points, so the entire airspace is represented by a dynamically generated set of cubes, wherein each cube is defined by its centroid, the original grid point, and associated weather measuring parameters remaining homogeneous within the generated cube during a predefined period of time. The core engine 2 can align generated raw trajectories to said set of cube centroids as fixed 3D positions independent of trajectory data, wherein form trajectories are generated as 4D joint cubes, and wherein each cube is a segment that is associated with not only spatio-temporal attributes and with the weather measuring parameters. The system 1 can comprise machine learning means, wherein the machine learning means are applied and trained based on predefined inference structures derived from historical measure data by applying a stochastic structure for predicting and generating the flight trajectories taking environmental uncertainties into account. The stochastic structure can, for example, be based on a Hidden Markov Model (HMM). During the operation and processing of the system 1, time series clustering can e.g. be applied to generate input measure parameters from an excessive set of weather parameters. The input measure parameters generated form the excessive set of weather parameters can e.g. be fed into Viterbi algorithm-based processing means. The system 1 can e.g. solely use dynamically monitored real trajectory dataset with pertaining weather measuring parameters.

It is to be noted, that each generated trajectory or flight path is the path that a moving object, i.e. airplane, follows through space as a function of time A generated trajectory herein is thus a time-ordered set of states of a dynamical system (as given by Poincaré map). In the present dynamical adaptable system, such a first recurrence map or Poincaré map builds the intersection of a periodic orbit in the state space of a continuous dynamical system with a certain lower-dimensional subspace, i.e, the Poincaré section, transversal to the flow of the air traffic. A periodic orbit can be considered with initial conditions within a section of the space, which leaves that section afterwards, and observes the point at which this orbit first returns to the section. The system 1 creates a map to send the first point to the second. The transversality of the Poincaré section means that periodic orbits starting on the subspace flow through it and not parallel to it.

For each triggered occurrence of a time delay associated with a flight or flight trajectory 1221,1321, a corresponding trigger-flag is set by means of the core engine 2 to all risk-exposed units 41, . . . , 43 assignable to that flight 1221. A parametric transfer of payments is allocated to each trigger-flag by means of the system 1. Said assignment of the parametric transfer of payments to the corresponding trigger-flag is automatically activated by means of the system 1 for a dynamically scalable loss covering of the risk-exposed unit 41, . . . , 43. A loss associated with the triggered time delay is distinctly covered by the system 1 based on the respective trigger-flag and based on the received and stored payment parameters from the pooled risk-exposed units 41, . . . , 43 by the parametric payment transfer from the system 1 to the corresponding risk-exposed units 41, . . . , 43 by means of an automated activated damage recovering system or payment-transfer modules 7 operated or steered by a generated output signal of a failure deployment device 6 of the system 1. Finally, it is to be noted, that the present system 1 can be realized by means of using different structures, in particular as (i) fully integrated system into the airline's website, or credit card's website etc.; (ii) light integration; (iii) standalone app solution; and (iv) standalone website.

The core engine 2 can be realized so that the system 1 operates in the sense of a centralized control cockpit system allowing to distinctively and dynamically steer and control the cover and the distribution of the risk, e.g. limit the capacity per airline, per airport etc. or also not offer the cover in case of material risk changes or change the pricing mechanism if necessary, by means of the system 1. In addition there may be monitoring devices for associated risk transfer systems (as e.g. automated insurances) with read-only access and no access to the pricing engine. Therefore, system 1 has infer alia the advantage that, related to the automated risk steering and management, the steering means or cockpit can be realized as port of the here presented inventive system, (i) allowing real time adjustment on the pricing engine (rates and delay trigger), (ii) allowing the system 1 to steer capacity and accumulation per airport/airline/flight/day, (iii) allowing the system 1 to provide a real time profit and loss (P&L) guarantee or statement by airport/airline/flight/day, (iv) providing a real time profit and loss (P&L) guarantee or statement by airport/airline/flight/day to associated risk transfer systems, as e.g. automated insurance systems. Thus, the present inventive systems allows for the realization of an automated real-time risk steering system in a highly automated way, which was not possible with the known prior art systems.

The payment-transfer modules 7 or an insurance policy data management module of the flight trajectories-borne dynamic system 1 can for example be connected with an external sales system 4 via a dedicated port, and if a flight ticket and a flight delay insurance policy are sold, the external sales system 4 transmits insurance policy data to the payment-transfer modules 7 or the insurance policy data management module to perform the risk transfer from the risk-exposed unit 41, . . . , 43 to the dynamically adapted and operated system 1. The payment-transfer module 7 of the system 1 can for example be connected with a third-party payment platform through a dedicated port for transmitting payment parameters, at least comprising information of a transfer-out account, information of a transfer-in account, a transfer amount, and a verification key, to the third-party payment platform, and receiving the processing result state from the third-party payment platform. The parametric payment transfer from the system 1 to the corresponding risk-exposed units 41, . . . , 43 can for example be done by electronic payment transfer to a transfer-out account associated with a mobile telephone. However, the parametric payment transfer is not bound to cell or mobile phones, One of the advantages of the present inventions is, that the payment transfer, i.e. payout can be fully automated achieved via cell phone, but not only. It can also be realized via credit card or banks or online platforms or any other payment form of automatable electronic platforms. With credit card companies and/or potentially with other electronic payment transfer systems, there occurs the issue that these systems normally do not have access to detailed flight itinerary data. To overcome this problem, as embodiment variant, the present system 1 can be realized with data-access to capturing and feedback data systems as for example ARC (Airline Reporting Corporation) systems and/or BSP (Billing and Settlement Plan) systems. Note that said data capturing system may also form an integrated part of the herein proposed inventive system 1. With access to this data the present system 1 automatically matches the ticket number information that credit card companies have to the travel itinerary of the passenger, in order to have at necessary information and calculate a price for a trip. The ticket number allows for a biunique, one-to-one and onto identification of the various parameters, namely the flight, flight number, passenger or cargo etc. Each ticket number is issued only once. If a passenger cancels a flight or switch to another fight, an new, biunique ticket number is issued, i.e., as soon as there is a new ticket number issued (for example whenever the client decides to rebook or cancel his flight), the present system 1 is enabled to automatically update the risk-transfer and cover amending it to the new flight details by internal control means cancelling the previously offered cover and offer a new cover for the new flight. Regardless of the type of tickets used in the context of the present system 1, the appropriate ticket parameters may contain details of the following information: (i) The passenger's name; (ii) The issuing airline. (iii) A ticket number, including the airline's 3 digit code at the start of the number; (iv) The cities the ticket is valid for travel between; (v) Flight that the ticket is valid for. (Unless the ticket is "open"); (vi) Baggage allowance; (vii) Fare; (viii) Taxes; (ix) The "Fare Basis", an alpha or alpha-numeric code that identifies the fare; (x) Restrictions on changes and refunds; (xi) Dates that the ticket is valid for; (xii) "Form of payment", i.e., details of how the ticket was paid for, which will in turn affect how it would be refunded; (xiii) The Rate of Exchange used to calculate any international parts of the fare and fax; and/or (xiv) A "Fare Construction" or "Linear" showing the breakdown of the total fare. The ticket number can comprise the airline ticket identification number, Airline tickets have 15-digit identification numbers biuniquely associated with each of them. The first 14 digits identify the ticket and the $15^{th}$ and last one is the check digit. For example, a possible identification number and check digit may be 0-001-1300696719-4. The first digit in this example is a 0 and is the coupon number. A coupon number of 1 identifies a ticket for the first flight of the trip, a 2 identifies a ticket for the second flight of the trip, etc. The coupon number 0 identifies the customer receipt. The second part of the identification number, in the example 001, identifies the airline. The third part, in the example 1300696719, is the document number. And the last digit, in the example 4, is the check digit. Airline tickets use a "mod 7" check digit scheme.

The mentioned Airlines Reporting Corporation (ARC) system is a system providing electronic ticket transaction settlement services between airlines and travel agencies (both traditional and online) and the travel management companies that set their products. The ARC system mainly provides the U.S.-based travel industry with business products services, travel agency accreditation services, automated process and financial management tools, and data analytics and data processing systems. Especially, ARC also electronically offers its transactional data within various industries, including financial, to support other systems of the airline industry in order to function properly. The BSP (Billing and Settlement Plan) system is a system designed to facilitate and simplify automated selling, reporting and remitting procedures of IATA Accredited Passenger Sales Agents, as well as improve financial control and cash flow for BSP Airlines. A BSP is the central system through which data and funds flow between travel agents and airlines. Instead of every agent having an individual relationship with each airline, all of the information is consolidated and pathwayed through the BSP system. Agents make one single payment to the BSP (remittance), covering sales on all BSP Airlines. The BSP makes one consolidated payment transfer to each airline, covering sales made by all agents in the country/region. Agents are provided with a range of electronic ticket numbers to be used for sales on any airline. BSP systems provide working processes for Agents typically structured in the following steps: (1) Preparation to sell on behalf of airlines: I.e. before an agent can begin selling on behalf of airlines, the following processing steps take place (i) A range of electronic ticket numbers are assigned to the Agent's system: (ii) The Airline assigns ticketing authority to the Agent to allow issue of ETs: (iii) Agents need to have access to an IATA-approved ticketing system such as a Global Distribution System (GDS). (2) Automated reporting by Agents' systems: The agent's system electronically reports all sales and refunds at the end of the reporting period. This can be realized electronically, for example through BSPlink. All transactions are forwarded to a central BSP Data Processing Centre (DPC). (3) Processing operated by the BSP system by means of the Data Processing Centre: (i) Capturing of the tickets and refunds information from data files that have been transmitted by the GDS/ticketing system or other automated system such as BSPlink; (ii) Processing all relevant data and produce an "Agents Billing Analysis" for each agent. This analysis is compiled from the information of one or more reporting periods; (iii) Forwarding a statement of sales made by Agents to each BSP Airline. This statement is compiled from the information of one or more reporting periods; (iv) Monitoring ET ranges and provide replenishment as necessary. (4) Payment transfer and determination: The Agent's system just makes one net remittance, respectively payment data transfer, covering all its BSP transactions for that period for all BSP Airlines. The BSP preferred method of payment is by direct debit. (5) Follow up processing by Airlines: The accounting system of each airline automatically audits incoming data and addresses debit/credit accounting memoranda (ADM/ACM) to agents' systems if necessary. The plurality of payment-transfer modules 7 configured to receive and store payments from the risk-exposed units 41, ..., 43 for the pooling of their risks and resources can thus be associated with the transfer-out account of a corresponding risk-exposed unit 41, ..., 43. The plurality of payment-transfer modules 7 can for example also be configured to receive and store payments from the risk-exposed units 41, ..., 43 for the pooling of their risks and resources are assigned to external sales system 4 belonging to airlines or air transportation sellers, wherein the external sales system 4 transfers a total payment for all of its sold air transportation tickets to risk-exposed units 41, ..., 43. In this context, the external sales system 4 transfers a covering payment only for selected segments of sold air transportation tickets to risk-exposed units 41, ..., 43.

Finally, as an alternative, an additional filter module 51 of said core engine 2 can for example dynamically increment a time-based stack with the transmitted flight delay parameters 1322 based on the selectable trigger-table 13 and activate the assignment of the parametric transfer of payments to the corresponding trigger-flag by means of the filter module 51 if a threshold, triggered on the incremented stack value, is reached. Said assignment of the parametric transfer of payments to the corresponding trigger-flag can for example be automatically activated by means of the system 1 for a dynamically scalable loss covering of the risk-exposed unit 41, ..., 43 with a definable upper coverage limit, wherein the payments are automatically scaled based on the likelihood of said risk exposure of a specific flight or flight trajectory. The risk-transfer system 1 can for example further comprise an assembly module 52 to process risk-related flight or flight trajectory data 121, 131 and to provide the likelihood for said risk exposure of a flight or flight trajectory 1221, 1321 based on the risk-related flight or flight trajectory data 121, 131, wherein the risk-exposed units 41, ..., 43 are connected to the flight delay risk-transfer system 1 by means of the plurality of payment-receiving modules 7 configured to receive and store payments associable with the pooled risk-exposed units 41, ..., 43 for the pooling of their risks and wherein the payments are automatically scaled based on the likelihood of said risk exposure of a specific flight or flight trajectory 121, 131.

The ground-based flight control stations 921, ..., 924 and aircraft controllers 911, ..., 914 are linked via a communication network 50 to a core engine 2 of the system 1. The ground-based flight control stations 921, ..., 924 and aircraft controllers 911, ..., 914 may be part of an aviation system that is for example part of a technical system of an operator of an aircraft fleet, such as an airline or air cargo/air freight transport company, but also of an aircraft manufacturer, such as Airbus or Boeing, etc., or flight monitoring services of an airport flight system. The aircraft 81, ..., 84 may comprise, for example, aircraft for cargo transport and/or passenger transport and/or air ships, such as zeppelins, or even shuttles or other flight means for space travel. The aircraft 81, ..., 84 can likewise comprise motorized and non-motorized flight means, in particular gliders, power gliders, hang gliders and the like. As mentioned, the ground stations 921, ..., 924 and aircraft controllers 911, ..., 914 can for example be linked via a communication network 50 to the core engine 2, wherein the trigger module 3 is dynamically triggered on the airport data flow pathway of ground-based flight controllers 921, ..., 924 and aircraft controllers 911, ..., 914 via said communication network 50. For each triggered occurrence of a flight delay assigned to a table element 122, 132 of the selectable trigger-table 12, 13, the assigned operational air parameters are matched with the corresponding design flight delay threshold value by means of the core engine 2. The transmission of the air data parameters 121, 131. Respectively, the triggering in said data pathway may also include further parameters. For example, the parameters may also include log parameters of aircraft at moments situated at a specific airport, for example, measured value parameters of the flight management system (FMS) and/or of the inertial navigation system (INS) and/or of the fly-by-wire sensors and/or flight monitoring devices of the aircraft, thereby automatically detecting or verifying airport closings. The transmission can comprise unidirectional or bidirectional end-to-end data and/or multimedia stream-based transmissions for example via a packet-switched communication network such as an IP network or via a circuit-switched communication network using an appropriate protocol. Said communication network interface 31 of the trigger module 3 can be realized by one or more different physical network interfaces or layers, which can support several different network standards. By way of example, this physical layer of the communication network interface 31 of the trigger module 3 may comprise contactless interfaces for WLAN (Wireless Local Area Network), Bluetooth, GSM (Global System for Mobile Communication), GPRS (Generalized Packet Radio Service), USSD (Unstructured Supplementary Services Data), EDGE (Enhanced Data Rates for GSM Evolution) or UMTS (Universal Mobile Telecommunications System), etc. However, these may also be physical network interfaces for Ethernet, Token Ring or another Wired LAN (Local Area Network). The reference symbols 50/51 can accordingly comprise various communication networks, for example a Wireless LAN (based on IEEE 802.1x), a Bluetooth network, a Wired LAN (Ethernet or Token Ring), or a mobile radio network (GSM, UMTS, etc.) or a PSTN network. As mentioned, the physical network layer of the communication network interface 31 may be not only packet-switched interfaces, as are used by network protocols directly, but also circuit-switched interfaces, which can be used by means of protocols such as PPP (Point to Point Protocol), SLIP (Serial Line Internet Protocol) or GPRS (Generalized Packet Radio Service) for data transfer.

In addition, the risk-exposed units 41, . . . , 43 can comprise an identification module. With regard to the risk-exposed units 41, . . . , 43, this identification module may be implemented in hardware or at least partially in software and may be connected to the trigger module 3 by means of a contact-based or contactless communication network interface 31. In particular, the identification module may be in the form of a SIM card, as are known from the GSM standard. This identification module can contain, inter alia, the authentication data, which is relevant for authenticating the related device in the network 50. This authentication data may comprise, in particular, an IMSI (International Mobile Subscriber Identifier) and/or TMSI (Temporary Mobile Subscriber Identifier) and/or LAI (Location Area Identity), etc., which are based on the GSM standard. With the additional implementation of such identification modules, the system 1 can be completely automated, including the generation and transmission of output signals 61 by means of a failure deployment device 6 and operation of an automated payment transfer module or loss covering system 7. It allows for an independent verification of the loss suffered by the risk-exposed units 41, . . . , 43. In this alternative embodiment where the connected risk-exposed units 41, . . . , 43 comprise an identification module, such as a SIM card for storing an IMSI, the risk-exposed units 41, . . . , 43 may also comprise means for transmitting the IMSI for example to the registration module of the system 1 on request. The IMSI can thus be stored in an appropriate user database of the registration module. To authenticate an identification or identifier, the registration module can use the extensible authentication protocol, for example. In the case of GSM-based authentication using a location register, the system 1 can also comprise an appropriate signaling gateway module for complementing the logical IP data channel to form signal and data channels in a GSM network to such a location register. A MAP gateway module can be used to generate the necessary SS7/MAP functions for authenticating the interfaces or rather the transmitted identification stored at the corresponding identification module. The registration module authenticates the at least one communication network interface using the user database, e.g., of the location register, and the signaling gateway module on the basis of the IMSI of the SIM card. Once a successful authentication is stored in the user database of the registration module, an appropriate entry is stored and/or the data link to the one or more communication network interfaces can be set up, for example by means of the trigger module 3 and/or the core engine 2.

It is important to understand that the present automated system 1 allows for realization of Retail Flight Delay insurance (FDI) systems, as well as Bulk FDI systems. For FDI systems, individual passengers are offered the opportunity to buy risk-transfer, i.e., insurance, when they buy a ticket online. The process is 100% automated by means of the technical realization of the present system 1. The benefit will be paid instantly via cell phone when the delay threshold is met (e.g., when gate arrival delay exceeds 1 hour; product could also have several triggers, including on departure and arrival delays). The seller can be the airline operating the flight, travel operators and/or credit card companies. The advantage to the risk-exposed unit 41, . . . , 43, i.e., the passenger or good to be transported, is protection against costs arising from delays (i.e., hotel stay, transportation needs, etc.) and receiving the payment seamlessly when they have to incur such costs. For automated bulk FDI systems, the present invention is suitable for airlines or other companies involved in the travel business—such as credit card companies—to offer compensation to their customers for flight delays. The basic idea is that the partner company pays a fixed premium per annum and we pay all delay claims. The company embeds the insurance cost in the ticket price/credit card fee and positions delay insurance as a differentiating service. The partner company can make this service available to all passengers or to select segments (e.g., business class passengers, holders of gold cards, etc.). The advantage of such a bulk risk-transfer by means of the present system 1 is to allow for (i) a differentiation from competitors through value-accretive services to customers, (ii) specifically for airlines: 'Hedge' their legal obligations (e.g. in EU Flight Delay Compensation Regulation 261).

For a realistic performance of the system 1, the present system 1 was tested using, as captured air data parameters 121,131, further data such as (i) historic flight data for more than 120 million flights (2013 present) and data containing departure & arrival airports, airline, aircraft type, scheduled and actual arrival and departure times, among others, (ii) prospective flight schedule data (flights are planned up to 1 year in advance and updated on a weekly basis), which is used to improve predictability of delay patterns, (iii) historic meteorological data, which is used to improve the understanding of delay patterns, (iv) real-time weather and air traffic data will be available in the near future and help to improve delay predictions. The system 1 uses a Delay Probability Functions (DPFs) that is the basis for generating price FDI coverage by the system 1. Typically, a DPF provides the best estimate for delay probabilities for a specific flight, where (i) a departure delay is defined as the difference between actual gate departure and scheduled gate departure, (ii) an arrival delay is defined as the difference between actual gate arrival and scheduled gate arrival, (iv) delay thresholds: probable delay exceeds 30', 45', 60', 90', 150', 180', and 360' (or a continuous function), and (iv) flight is defined by departure and arrival airport, operator/airline, time, date, week day, week # and month. For the proof of operability, for example, only historical data can be used. However, extensions with real-time data can be also considered.

It is to be noted that the system 1 of the present invention, in contrast to the prior art systems, allows for a dynamic pricing for the risk-transfer by means of the system. Delays typically depend on various factors (e.g., traffic density, day/season, weather, airline processes). If block time is defined as the planned flight duration (from push back at departure gate to destination gate arrival), block times strongly correlate to delays, i.e. the higher a block time, the lower the probability of delay. All other things being held constant, if block times are increased by 30', average delays will shrink by −30'. Furthermore, block times have a seasonal pattern and sometimes also trends. In addition, airlines have different approaches/strategies to plan and set their block times. The system 1 can generate delay probabilities based on historical flight data for every route and airline. These delay probability functions (DPFs) are corrected for a wide range of factors impacting delays (static pricing). When predicting delays for future flights, the DPFs are to be corrected for future changes in block times (block time schedule data is available up to one year in advance; this is required for air traffic and airport capacity planning) and for taking into account weather conditions (relevant for pricing close to departure). Therefore, the advantages of dynamic pricing, as provided by the present system 1, are manifold, especially (i) more accurate delay predictions, better pricing with predictable loss ratios, and (ii) considering not only historic flight data, but also future block times and weather information all tied into a smart pricing engine. In summary, block times change over time. Therefore, an automated system must be able to change dynamically in order to take into account the relevant factors to issue accurate delay estimates, which are crucial to profitable flight-delay risk-transfer structures.

LIST OF REFERENCES

1 Flight trajectory prediction system and flight trajectory-borne automated delay-risks transfer system
   11 Automated repository for pooling of resources
   12 Selectable trigger-table
      121 Air data parameters
      122 Table elements
         1221 Flight or flight trajectory identification
         1222 Flight time parameters
   13 Selectable trigger-table
2 Core engine
3 Trigger module
   31 Data capturing means with communication network interface
4 Air transportation seller system
   41, . . . , 43 Risk-exposed units
5 Filter module
6 Failure deployment device
   61 Output signal
7 Payment-transfer modules
   71 Data transmission interface
50/51 Communication network
81, . . . , 84 Aircraft/Air transportation means
911, . . . , 914 Aircraft controllers
921, . . . , 924 Ground-based flight controllers

The invention claimed is:

1. An automated flight trajectory prediction and flight trajectory-borne automated delay risk-transfer system based on a recognizable nature of flight patterns related to airspace risks for risk sharing of a variable number of risk-exposed units by pooling resources of the risk-exposed units and by providing the risk-transfer system as a self-sufficient operatable risk-transfer system based on the pooled resources for the risk-exposed units by a resource-pooling system associated with the risk-transfer system, wherein the risk-exposed units are connected to the risk-transfer system by a plurality of payment-transfer devices configured to receive and store payments from the risk-exposed units for the pooling of their risks and resources, and wherein an automated transfer of risk exposure associated with the risk-exposed units is provided by the risk-transfer system, the risk-transfer system comprising:

a monitoring device implemented by processing circuitry and configured to capture or measure air data parameters of aircraft controllers and/or ground-based flight controllers of airports or flight control systems;

a core engine implemented by the processing circuitry and linked to the aircraft controllers and/or the ground-based flight controllers via a communication network, the core engine including a filter device configured to filter the monitored air data parameters for detection of flight indicators indicating predicted or actual flight time parameters assigned to a specific flight trajectory of the aircraft; and a trigger device implemented by the processing circuitry and configured to dynamically trigger on the data flow pathway via the communication network, the trigger device comprising a flight trigger to trigger and filter predicted flight trajectories generated by the core engine based on the measured air data parameters and flight indicators associated with the generated predicted flight trajectories, wherein the processing circuitry is configured to dynamically generate a 3D grid network table representing digitized airspace, where each grid point is a location of weather measure parameters, and generate cubes around the grid points, so an entire airspace is represented by a dynamically generated set of cubes, wherein each cube is defined by its centroid, the original grid point, and associated weather measuring parameters remaining homogeneous within the generated cube during a predefined period of time, wherein the core engine is further configured to align generated raw trajectories to the set of cube centroids as fixed 3D positions independent of trajectory data, form trajectories are generated as 4D joint cubes, each cube is a segment that is associated with spatio-temporal attributes and with the therein located weather measuring parameters, wherein a predicted flight trajectory of the predicted flight trajectories is generated as a time-ordered, dynamical set of states, wherein, the core engine by using machine learning, predicts and generates the flight trajectories, the machine learning being applied and trained based on predefined inference structures derived from historical measure data by applying a stochastic structure taking environmental uncertainties into account, wherein the stochastic structure is based on a Hidden Markov Model (HMM) structure, wherein the processing circuitry is configured to generate measure parameters from an excessive set of weather parameters during processing of the risk-transfer system by solely using a dynamically monitored real trajectory dataset with pertaining weather measuring parameters, and wherein in response to a triggering of an exceeding of the defined time-delay threshold value, operational parameters of the triggered flight trajectory of the aircraft comprising at least flight delay parameters and flight identification are captured and stored to a table element of a selectable trigger-table assigned to the flight identifier of the aircraft, wherein for each triggered occurrence of a time delay associated with a specific flight trajectory, the core engine is configured to set a corresponding trigger-flag to all risk-exposed units assignable to the specific flight trajectory, and a parametric transfer of payments is allocated to each trigger-flag, the allocation of the parametric transfer of payments to the corresponding trigger-flag is automatically activated by the risk-transfer system for a dynamically scalable loss covering of the risk-exposed units with a definable upper coverage limit, the payments being automatically scaled based on a likelihood of the risk exposure of the specific flight trajectory, and the risk-transfer system is configured to check and monitor the risk accumulation and determine the payment dynamically based on the total risk accumulated and based on defined travel parameters, a loss associated with the triggered time delay being distinctly covered by the risk-transfer system based on the respective trigger-flag and based on the received and stored payment parameters from the pooled risk-exposed units by the parametric payment transfer from the risk-transfer system to the corresponding risk-exposed units by the payment-transfer devices operated or steered by a dynamically generated output signal of the risk-transfer system.

2. The automated flight trajectory prediction and flight trajectory-borne automated delay risk-transfer system according to claim 1, wherein the filter device of the core engine is configured to dynamically increment a time-based stack with the transmitted flight delay parameters based on the selectable trigger-table and activate assignment of the parametric transfer of payments to the corresponding trigger-flag by the filter device when a threshold, triggered on the incremented stack value, is reached.

3. The automated flight trajectory prediction and flight trajectory-borne automated delay risk-transfer system according to claim 1, wherein
the risk-transfer system operates via the core engine as a centralized risk steering and management cockpit device distinctively and dynamically steering a cover by the core engine, the distribution of the risk being dynamically adapted by the risk-transfer system and/or the capacity being dynamically or statically limited per airline and/or per airport, or rejecting the cover in response to material risk changes or a change of pricing mechanism.

4. The automated flight trajectory prediction and flight trajectory-borne automated delay risk-transfer system according to claim 1, wherein
transferred resources are adapted for each single transferred risk at least in dependency of the time-delay threshold value to the departure of the flight, and
a resource based uncertainty factor is scaled dynamically down in dependency of the time-delay threshold value to the departure of the flight.

5. The automated flight trajectory prediction and flight trajectory-borne automated delay risk-transfer system according to claim 1, wherein
a payment-transfer device of the plurality of payment-transfer device or an insurance policy data management device is connected with an external sales system via a dedicated port, and
in response to a flight ticket and a flight delay insurance policy being sold, the external sales system transmits insurance policy data to the insurance policy data management device to accomplish the risk transfer from the risk-exposed units to the risk-transfer system.

6. The automated flight trajectory prediction and flight trajectory-borne automated delay risk-transfer system according to claim 1, wherein a payment-transfer device of the plurality of payment-transfer devices is connected with a third-party payment platform through a dedicated port for transmitting payment parameters, at least comprising information of a transfer-out account, information of a transfer-in account, a transfer amount, and a verification key, to the third-party payment platform, and receiving a processing result state from the third-party payment platform.

7. The automated flight trajectory prediction and flight trajectory-borne automated delay risk-transfer system according to claim 1, wherein the parametric payment transfer from the risk-transfer system to the corresponding risk-exposed units is executed by electronic payment transfer to a transfer-out account associated with a mobile telephone.

8. The automated flight trajectory prediction and flight trajectory-borne automated delay risk-transfer system according to claim 6, wherein the plurality of payment-transfer devices configured to receive and store payments from the risk-exposed units for the pooling of their risks and resources associated with the transfer-out account of a corresponding risk-exposed unit.

9. The automated flight trajectory prediction and flight trajectory-borne automated delay risk-transfer system according to claim 1, wherein the defined time-delay threshold value is set individually for each of the risk-exposed units depending on the received and stored payments and/or resources from the risk-exposed units for the pooling of their risks.

10. The automated flight trajectory prediction and flight trajectory-borne automated delay risk-transfer system according to claim 1, wherein the defined time-delay threshold value is set individually for each of the risk-exposed units and flights or flight trajectories.

11. The automated flight trajectory prediction and flight trajectory-borne automated delay risk-transfer system according to claim 1, wherein the plurality of payment-transfer devices configured to receive and store payments from the risk-exposed units for the pooling of their risks and resources are assigned to an external sales system of airlines or air transportation sellers, wherein the external sales system transfers a total payment for all of its sold air transportation tickets to risk-exposed units.

12. The automated flight trajectory prediction and flight trajectory-borne automated delay risk-transfer system according to claim 11, wherein the external sales system transfers a covering payment only for selected segments of sold air transportation tickets to the risk-exposed units.

13. The automated flight trajectory prediction and flight trajectory-borne automated delay risk-transfer system according to claim 1, wherein
the processing circuitry is further configured to process risk-related flight trajectory data and to provide a likelihood for the risk exposure of the specific flight trajectory based on the risk-related flight trajectory data,
the risk-exposed units are connected to the risk-transfer system via the plurality of payment-transfer devices configured to receive and store payments associable with the pooled risk-exposed units for the pooling of their risks, and
the payments are automatically scaled based on the likelihood for the risk exposure of the specific flight trajectory.

14. An automated flight trajectory prediction and flight trajectory-borne automated delay risk-transfer method for an automated, dynamically operatable risk-transfer system based on a recognizable nature of flight patterns for airspace risks sharing of a variable number of risk-exposed units by time-dependent, dynamically balanced pooling of resources of the risk-exposed units and by providing a self-sufficient operatable risk-transfer system based on the pooled resources for the risk-exposed units by a resource-pooling system associated with the risk-transfer system, wherein the risk-exposed units are connected to the risk-transfer system by a plurality of payment-transfer devices configured to receive and store payments from the risk-exposed units for the pooling of their risks and resources, and wherein an automated transfer of risk exposure associated with the risk-exposed units is provided by the risk-transfer system, the risk-transfer method comprising:
monitoring air data parameters of aircraft controllers and/or ground-based flight controllers of airports or flight control systems thereby capturing or measuring the air data parameters;

filtering, by a filter device, the monitored air data parameters for detection of flight indicators indicating predicted or actual flight time parameters assigned to a specific flight trajectory of an aircraft, the aircraft controllers and/or the ground-based flight controllers being linked via a communication network to a core engine of the risk-transfer system;

dynamically triggering, by a trigger device of the core engine, on the data flow pathway via the communication network, the trigger device comprising a flight trigger for triggering and filtering predicted flight trajectories generated by the core engine based on the measured air data parameters and flight indicators associated with the generated predicted flight trajectories;

dynamically generating a 3D grid network table representing digitized airspace, where each grid point is a location of weather measure parameters, and generating cubes around the grid points, so an entire airspace is represented by a dynamically generated set of cubes, wherein each cube is defined by its centroid, the original grid point, and associated weather measuring parameters remaining homogeneous within the generated cube during a predefined period of time;

aligning generated raw trajectories to the set of cube centroids as fixed 3D positions independent of trajectory data, wherein form trajectories are generated as 4D joint cubes, each cube is a segment that is associated with spatio-temporal attributes and with the therein located weather measuring parameters, a predicted flight trajectory of the predicted flight trajectories being generated as a time-ordered, dynamical set of states;

predicting and generating, by the core engine using machine learning, the flight trajectories, the machine learning being applied and trained based on predefined inference structures derived from historical measure data by applying a stochastic structure taking environmental uncertainties into account, wherein the stochastic structure is based on a Hidden Markov Model (HMM) structure;

generating measure parameters from an excessive set of weather parameters during processing of the risk-transfer system by solely using a dynamically monitored real trajectory dataset with pertaining weather measuring parameters;

in response to a triggering of an exceeding of the defined time-delay threshold value, capturing and storing operational parameters of the triggered flight trajectory of the aircraft comprising at least flight delay parameters and flight identification to a table element of a selectable trigger-table assigned to the flight identifier of the aircraft;

for each triggered occurrence of a time delay associated with the specific flight trajectory, setting, by the core engine, a corresponding trigger-flag to all risk-exposed units assignable to the specific flight trajectory, and allocating a parametric transfer of payments to each trigger-flag, wherein the allocating of the parametric transfer of payments to the corresponding trigger-flag is automatically activated by the risk-transfer system for a dynamically scalable loss covering of the risk-exposed units with a definable upper coverage limit;

automatically scaling the payments based on a likelihood of the risk exposure of the specific flight trajectory; and checking and monitoring, by the risk-transfer system, the risk accumulation and determining the payment dynamically based on the total risk accumulated and based on defined travel parameters, a loss associated with the triggered time delay being distinctly covered by the risk-transfer system based on the respective trigger-flag and based on the received and stored payment parameters from the pooled risk-exposed units by the parametric payment transfer from the risk-transfer system to the corresponding risk-exposed units by the payment-transfer devices operated or steered by a dynamically generated output signal of the risk-transfer system.

15. The automated flight trajectory prediction and flight trajectory-borne automated delay risk-transfer method according to claim 14, wherein the risk-transfer system operates via the core engine as a centralized risk steering and management cockpit device distinctively and dynamically steering a cover by the core engine, the distribution of the risk being dynamically adapted by the risk-transfer system and/or the capacity being dynamically or statically limited per airline and/or per airport, or rejecting the cover in response to material risk changes or a change of pricing mechanism.

16. The automated flight trajectory prediction and flight trajectory-borne automated delay risk-transfer method according to claim 14, further comprising:
adapting the transferred resources for each single transferred risk at least in dependency of the time-delay threshold value to the departure of the flight; and
scaling dynamically down a resource based uncertainty factor in dependency of the time-delay threshold value to the departure of the flight.

17. The automated flight trajectory prediction and flight trajectory-borne automated delay risk-transfer method according to claim 14, wherein the payment-transfer devices or an insurance policy data management device is connected with an external sales system via a dedicated port, the method further comprising:
in response to a flight ticket and a flight delay insurance policy being sold, transmitting, by the external sales system, insurance policy data to the insurance policy data management device to accomplish the risk transfer from the risk-exposed units to the risk-transfer system.

18. The automated flight trajectory prediction and flight trajectory-borne automated delay risk-transfer method according to claim 14, wherein a payment-transfer device of the plurality of payment-transfer devices is connected with a third-party payment platform through a dedicated port for transmitting payment parameters, at least comprising information of a transfer-out account, information of a transfer-in account, a transfer amount, and a verification key, to the third-party payment platform, and receiving a processing result state from the third-party payment platform.

19. The automated flight trajectory prediction and flight trajectory-borne automated delay risk-transfer method according to claim 14, further comprising:
executing the parametric payment transfer from the risk-transfer system to the corresponding risk-exposed units by electronic payment transfer to a transfer-out account associated with a mobile telephone.

20. The automated flight trajectory prediction and flight trajectory-borne automated delay risk-transfer method according to claim 14, further comprising:
receiving and storing, by the plurality of payment-transfer devices, payments from the risk-exposed units for the pooling of their risks and resources associated with the transfer-out account of a corresponding risk-exposed unit.

21. The automated flight trajectory prediction and flight trajectory-borne automated delay risk-transfer method according to claim 14, further comprising:
  setting the defined time-delay threshold value individually for each of the risk-exposed units depending on the received and stored payments and/or resources from the risk-exposed units for the pooling of their risks.

22. The automated flight trajectory prediction and flight trajectory-borne automated delay risk-transfer method according to claim 14, further comprising:
  setting the defined time-delay threshold value individually for each of the risk-exposed units and flights or flight trajectories.

23. The automated flight trajectory prediction and flight trajectory-borne automated delay risk-transfer method according to claim 14, wherein the plurality of payment-transfer devices configured to receive and store payments from the risk-exposed units for the pooling of their risks and resources are assigned to an external sales system of airlines or air transportation sellers, wherein the external sales system transfers a total payment for all of its sold air transportation tickets to the risk-exposed units.

24. The automated flight trajectory prediction and flight trajectory-borne automated delay risk-transfer method according to claim 23, wherein the external sales system transfers a covering payment only for selected segments of sold air transportation tickets to the risk-exposed units.

25. The automated flight trajectory prediction and flight trajectory-borne automated delay risk-transfer method according to claim 14, further comprising:
  processing risk-related flight trajectory data and providing a likelihood for the risk exposure of the specific flight trajectory based on the risk-related flight trajectory data, wherein the risk-exposed units are connected to the risk-transfer system by the plurality of payment-transfer devices configured to receive and store payments associable with the pooled risk-exposed units for the pooling of their risks, the payments being automatically scaled based on the likelihood for the risk exposure of the specific flight trajectory.

* * * * *